(12) United States Patent
Spencer et al.

(10) Patent No.: US 6,877,027 B1
(45) Date of Patent: Apr. 5, 2005

(54) SYSTEM AND METHOD FOR PROVIDING SYNCHRONIZATION VERIFICATION OF MULTIPLE APPLICATIONS ACROSS REMOTE SYSTEMS

(75) Inventors: Todd M. Spencer, Ft Collins, CO (US); John Marks, Ft Collins, CO (US); David J Sweetser, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,428

(22) Filed: Feb. 19, 2000

(51) Int. Cl.[7] ............................................. G06F 15/16
(52) U.S. Cl. ........................ 709/205; 719/318; 709/208; 345/759
(58) Field of Search ............................... 709/201, 202, 709/203, 208–211, 204–207, 248, 220, 222, 249, 223, 224; 345/751, 759; 719/313, 318

(56) References Cited

U.S. PATENT DOCUMENTS

| | | | | |
|---|---|---|---|---|
| 5,704,042 A | * | 12/1997 | Hester et al. ............... | 709/204 |
| 5,757,669 A | * | 5/1998 | Christie et al. ........ | 364/514.006 |
| 6,023,702 A | * | 2/2000 | Leisten et al. ............... | 707/100 |
| 6,057,835 A | * | 5/2000 | Sato et al. ................... | 345/332 |
| 6,161,146 A | * | 12/2000 | Kley et al. ................... | 709/248 |
| 6,199,116 B1 | * | 3/2001 | May et al. ................... | 709/310 |
| 6,308,199 B1 | * | 10/2001 | Katsurabayashi ........... | 709/204 |
| 6,314,453 B1 | * | 11/2001 | Hao et al. ................... | 709/205 |
| 6,336,134 B1 | * | 1/2002 | Varma ......................... | 709/205 |

* cited by examiner

Primary Examiner—Dung Dinh

(57) ABSTRACT

A system and method provides synchronization verification of multiple applications across remote systems. In particular, the system has local application sharing logic to receive events to be shared from a local application, having at least one local application window, and to transmit the events to be shared to remote application sharing logic. The remote application sharing logic receives events the to be shared from the local application sharing logic and transmits the events to at least one corresponding remote application for processing. The at least one corresponding remote application has at least one remote application window. A window synchronization verification logic correlates the at least one local application window with the at least one remote application window.

18 Claims, 29 Drawing Sheets

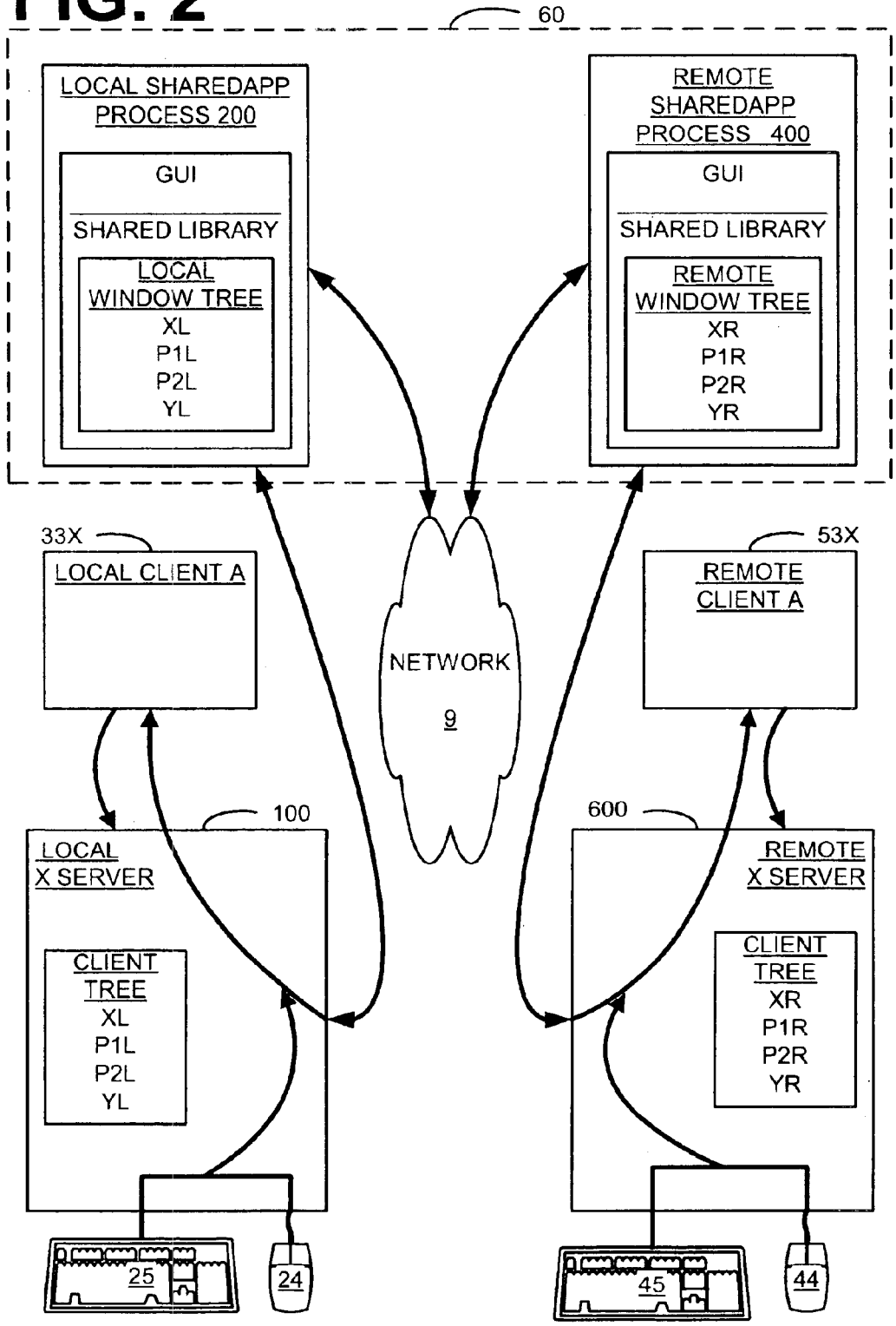

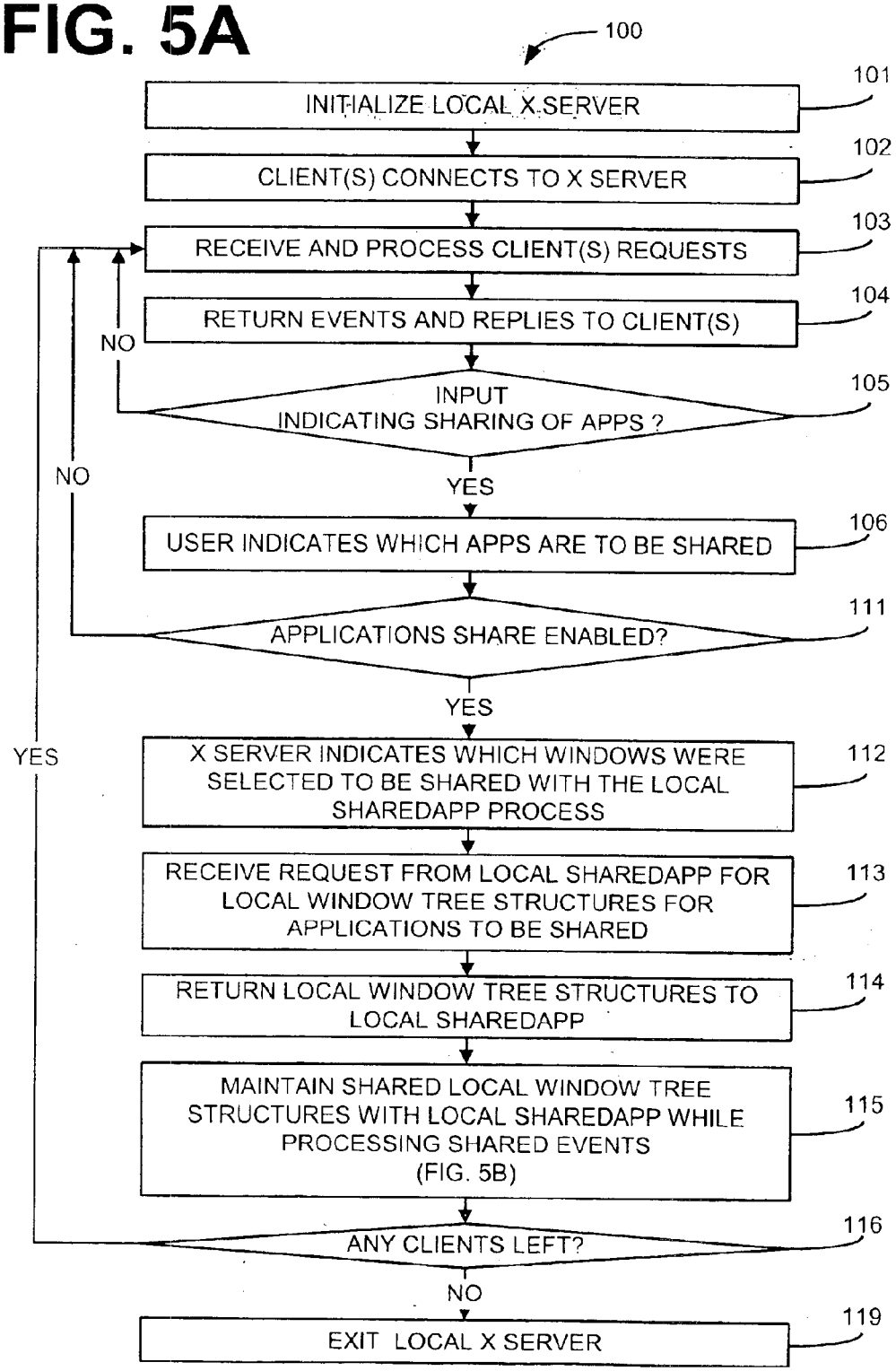

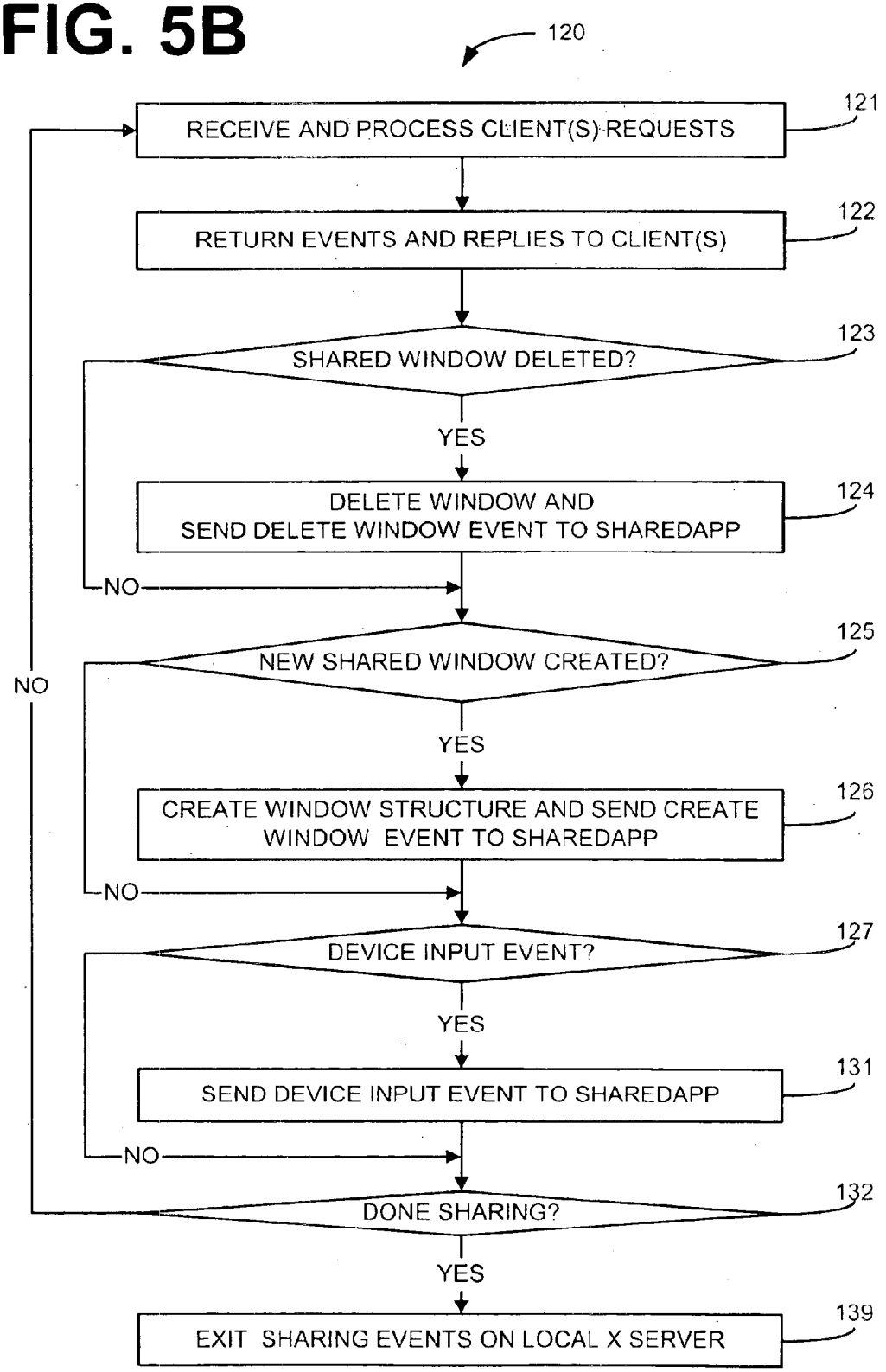

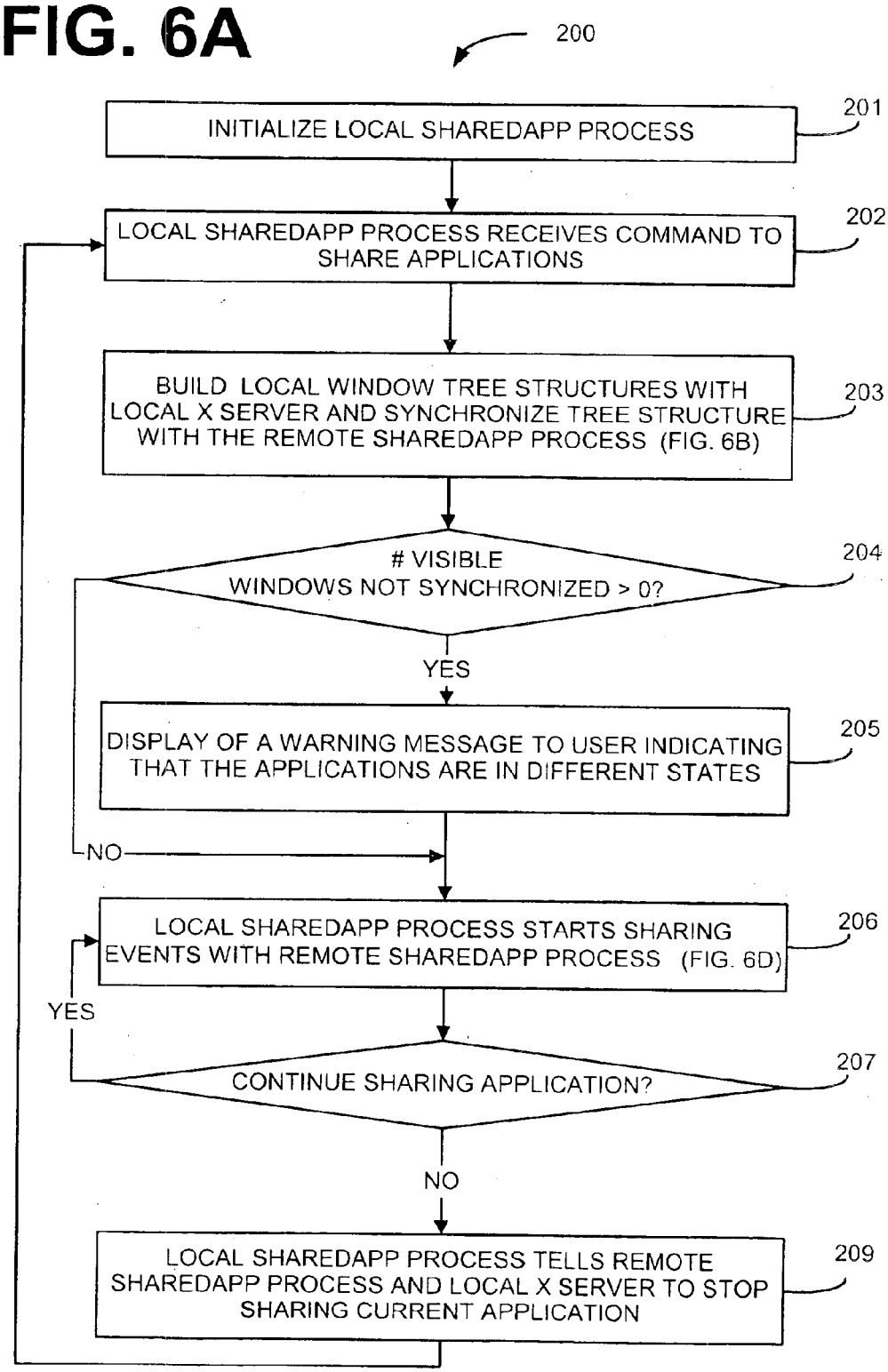

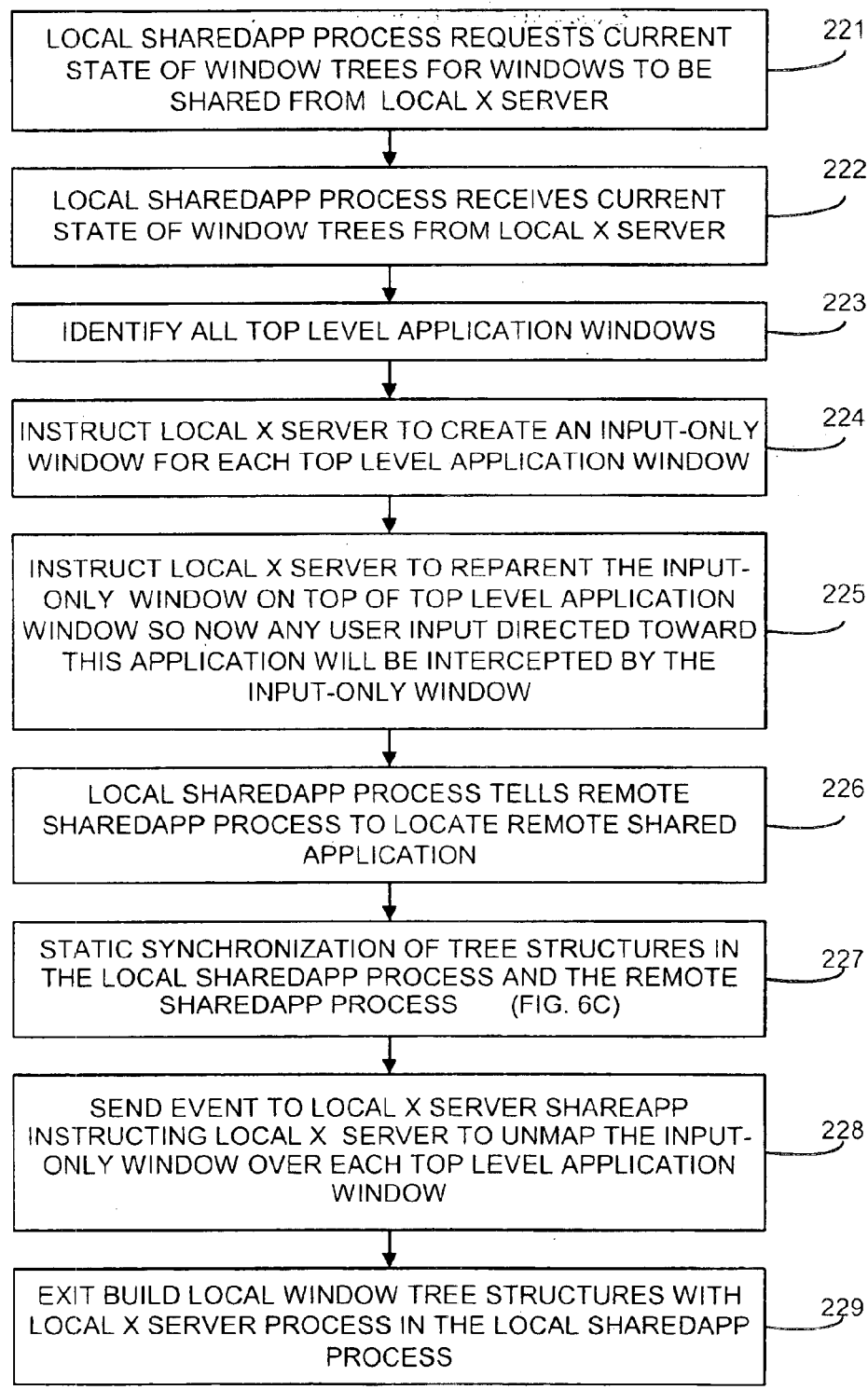

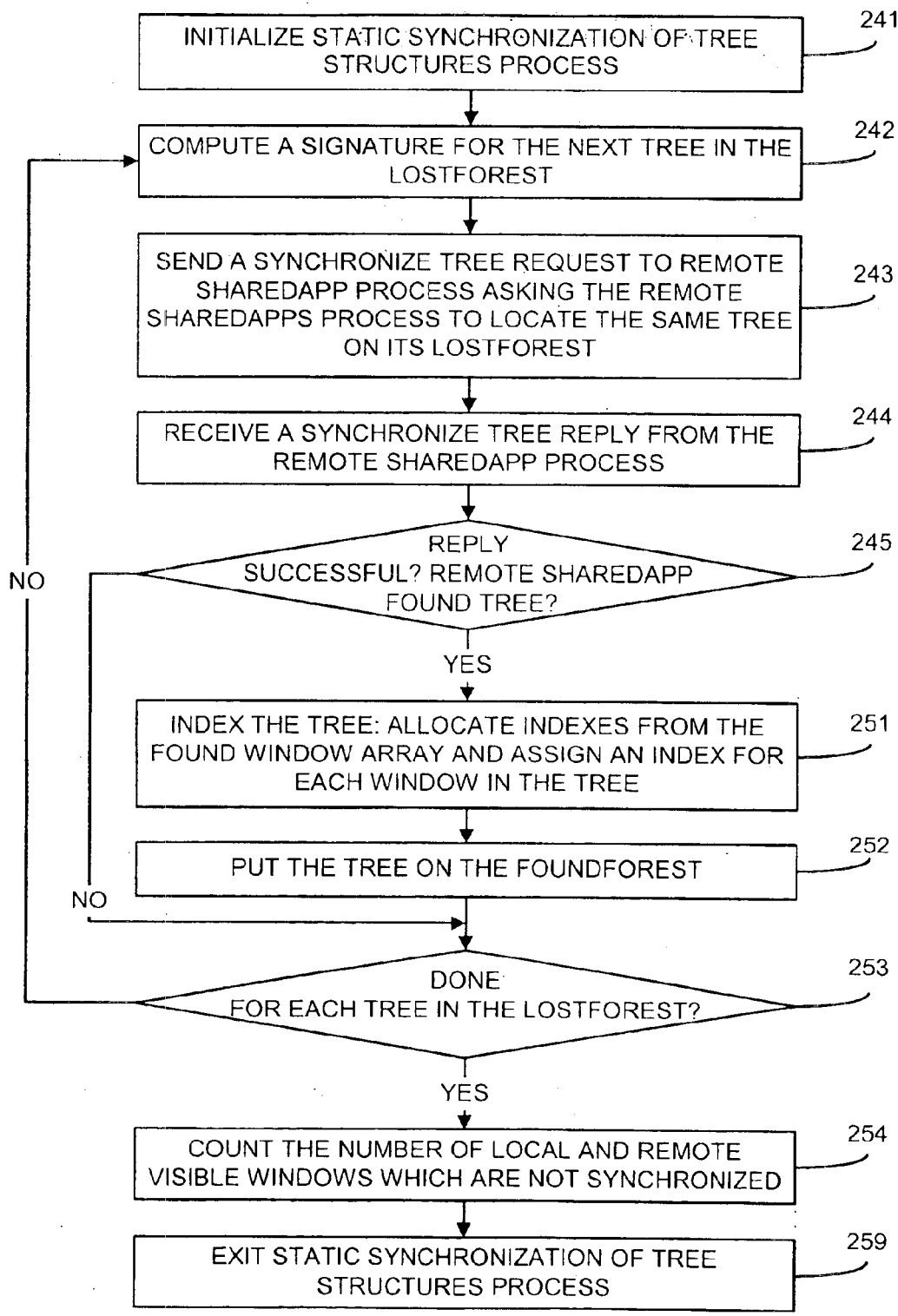

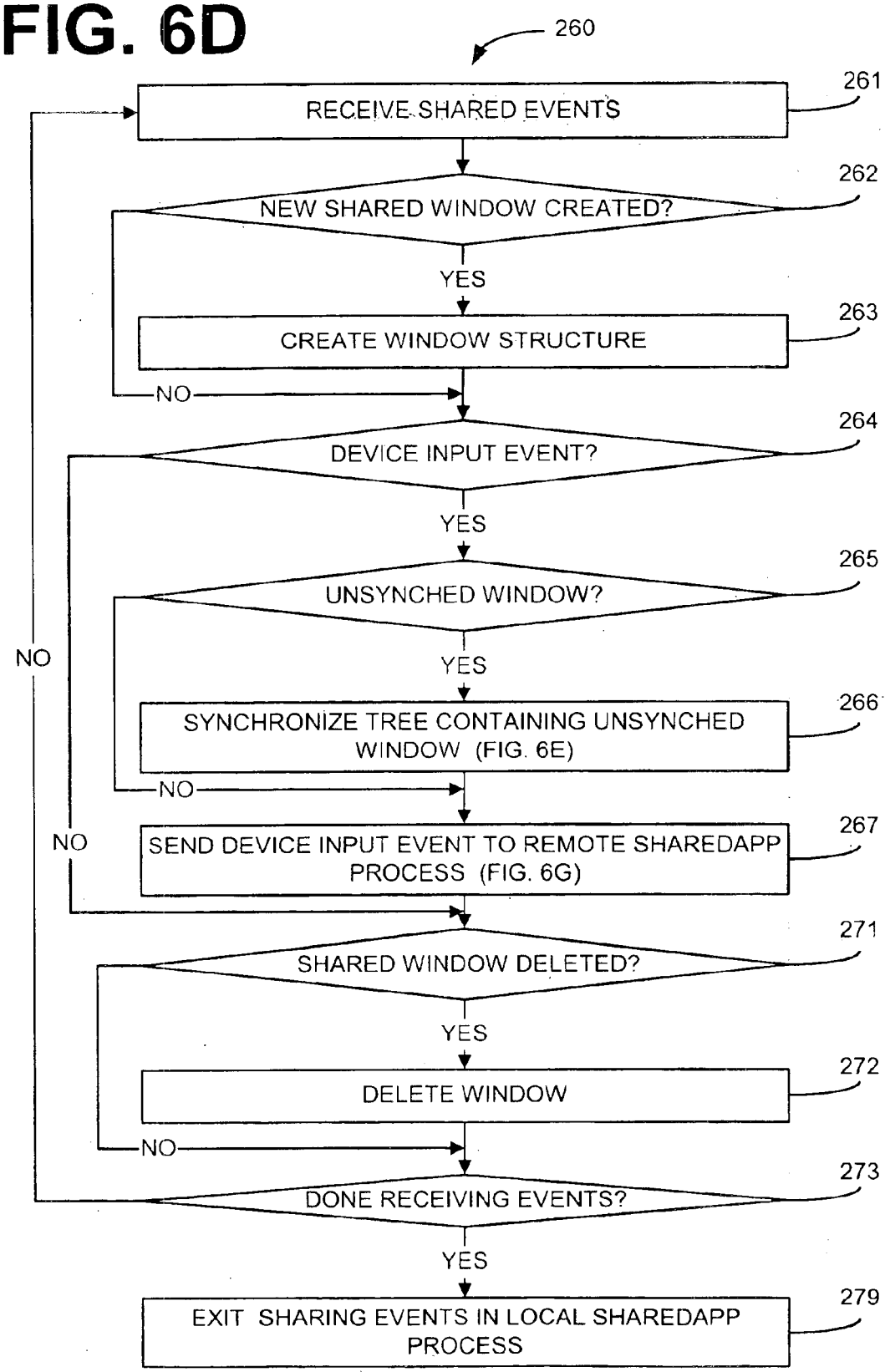

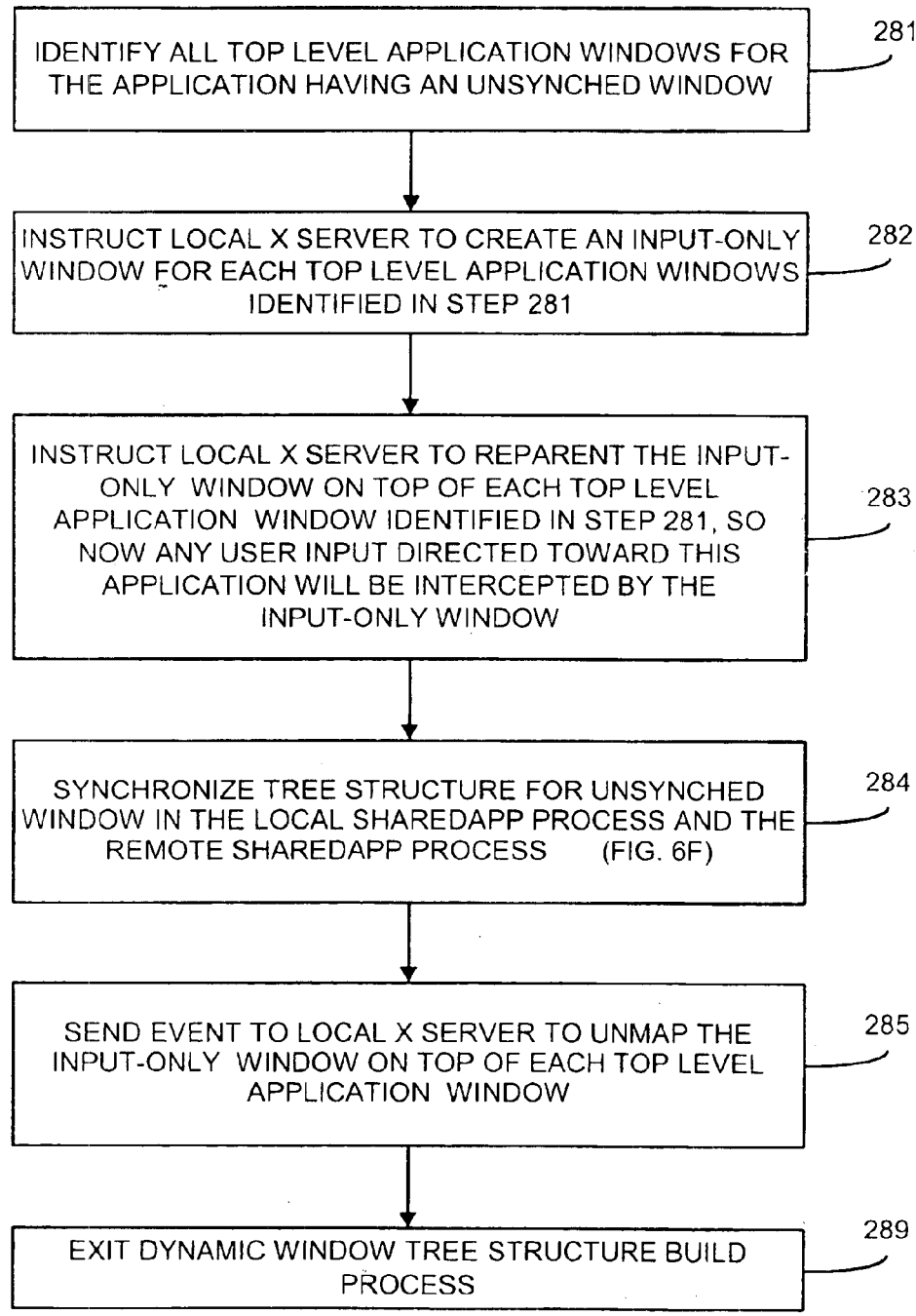

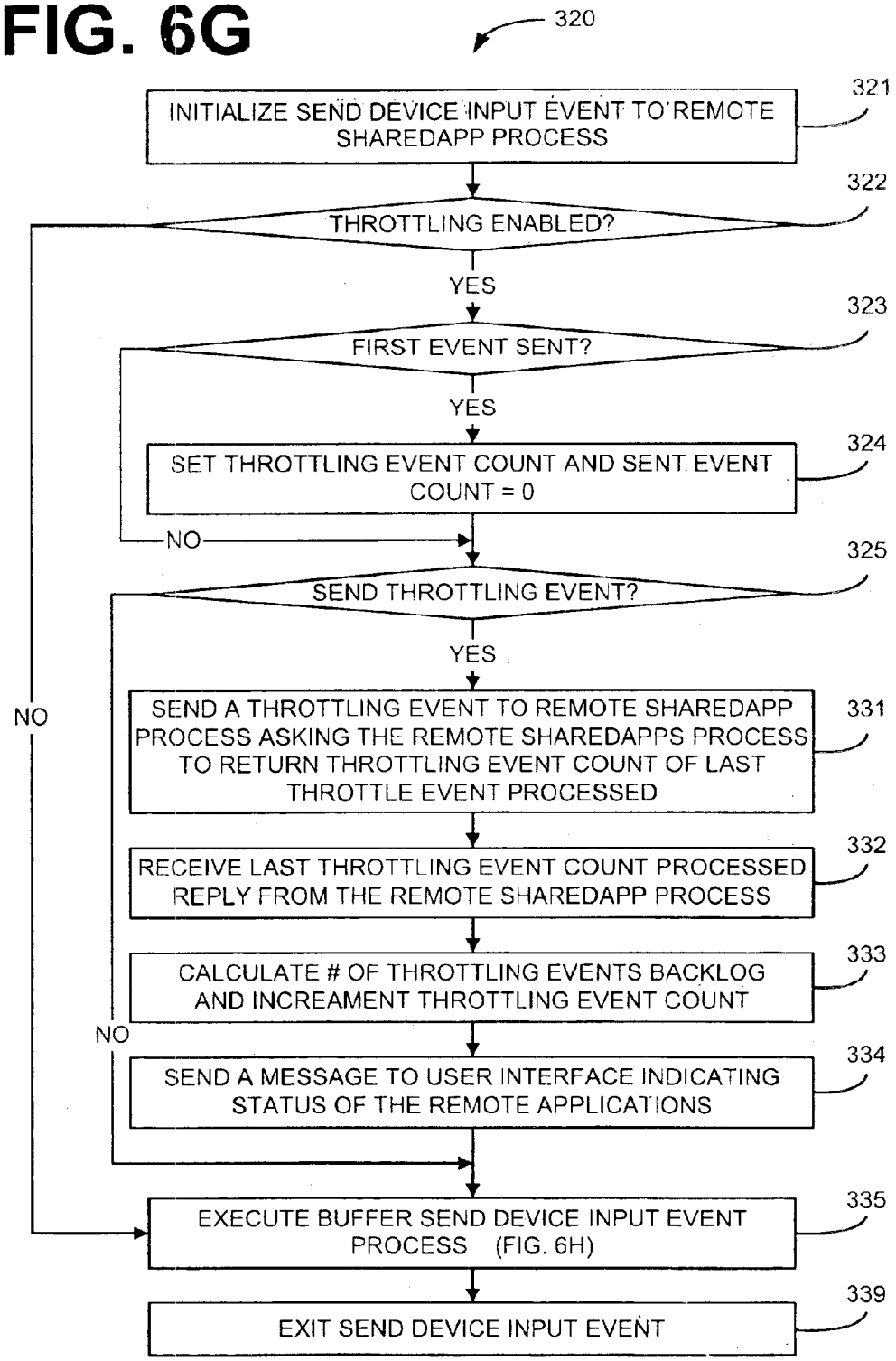

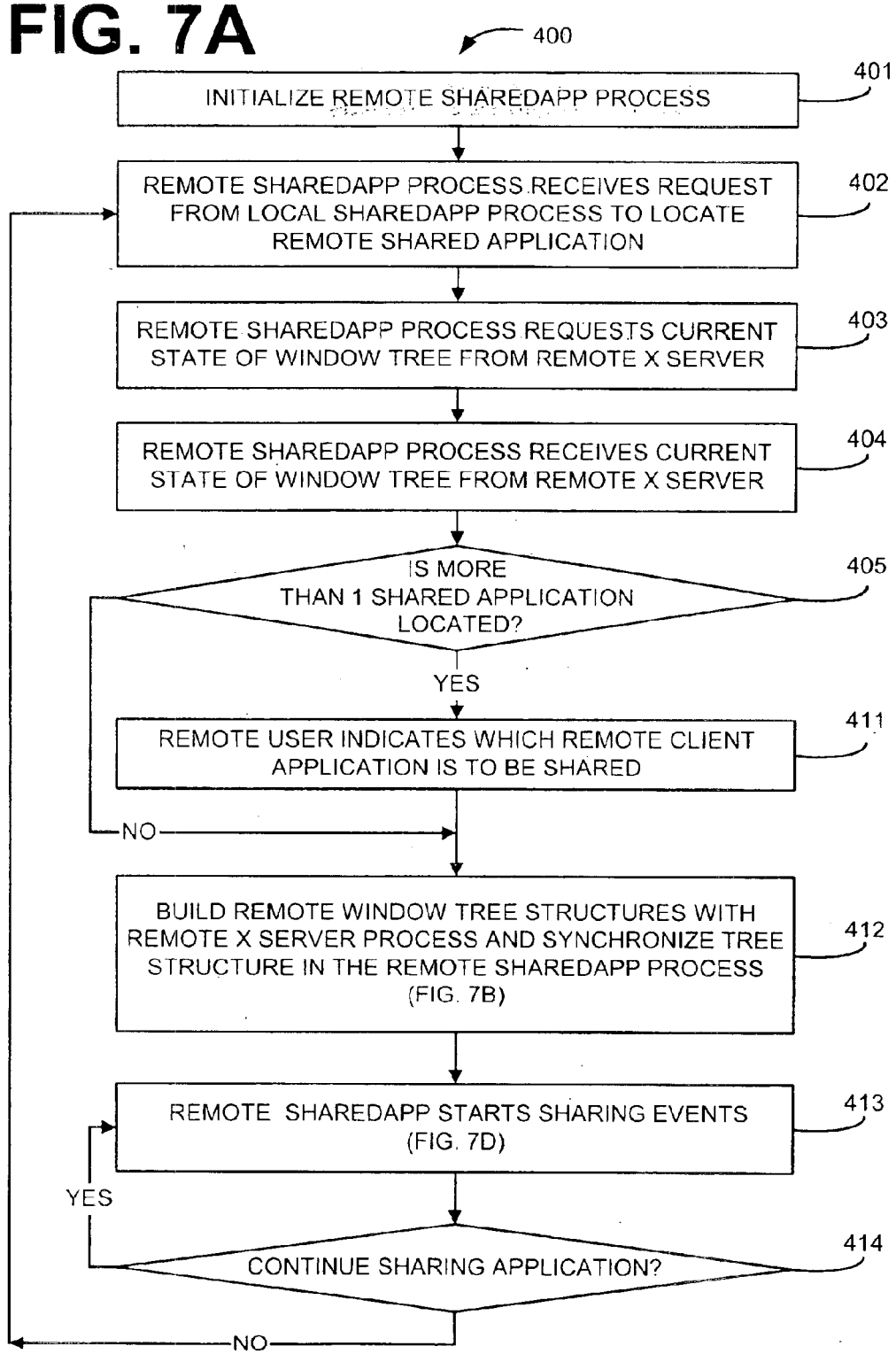

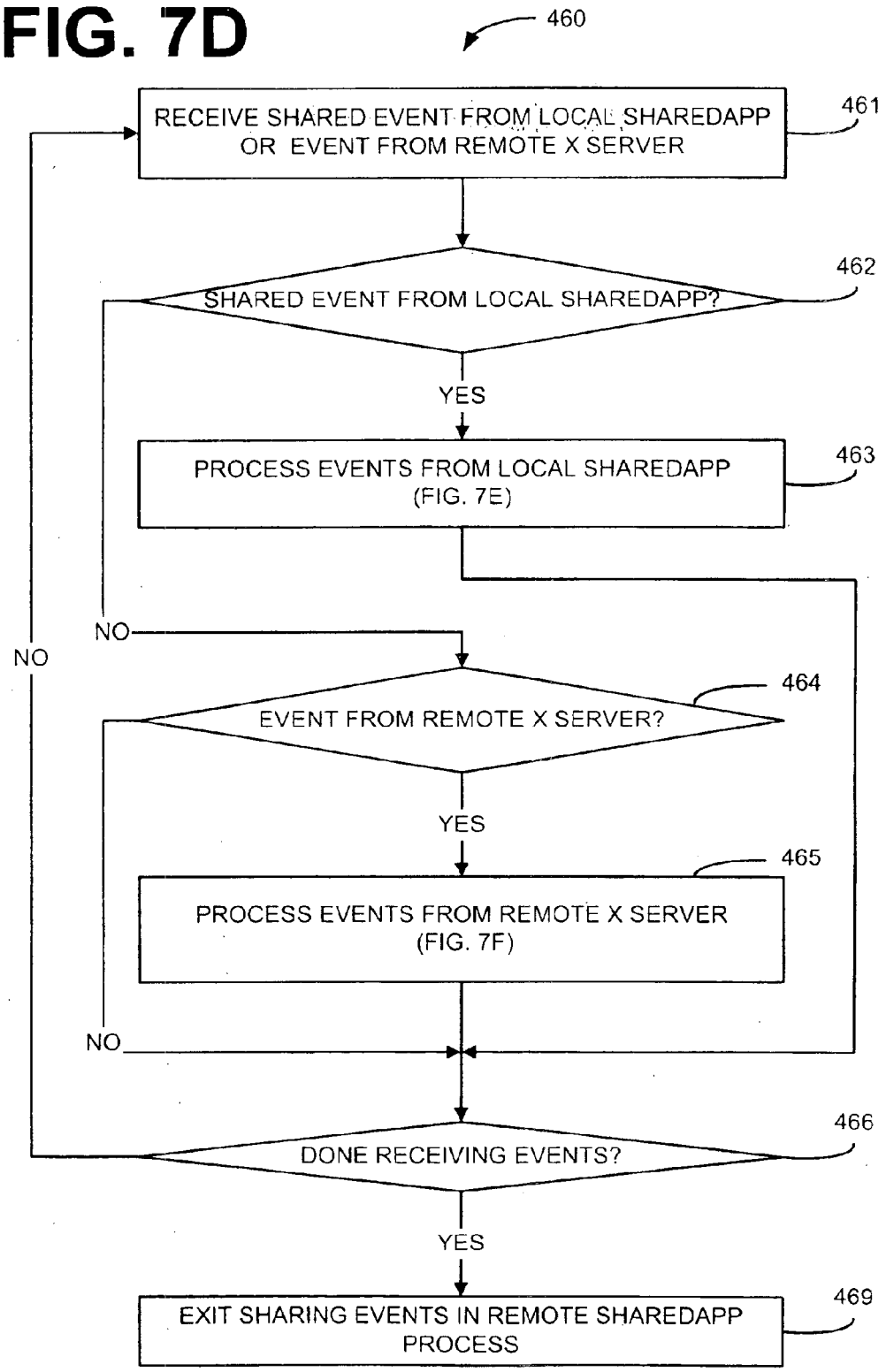

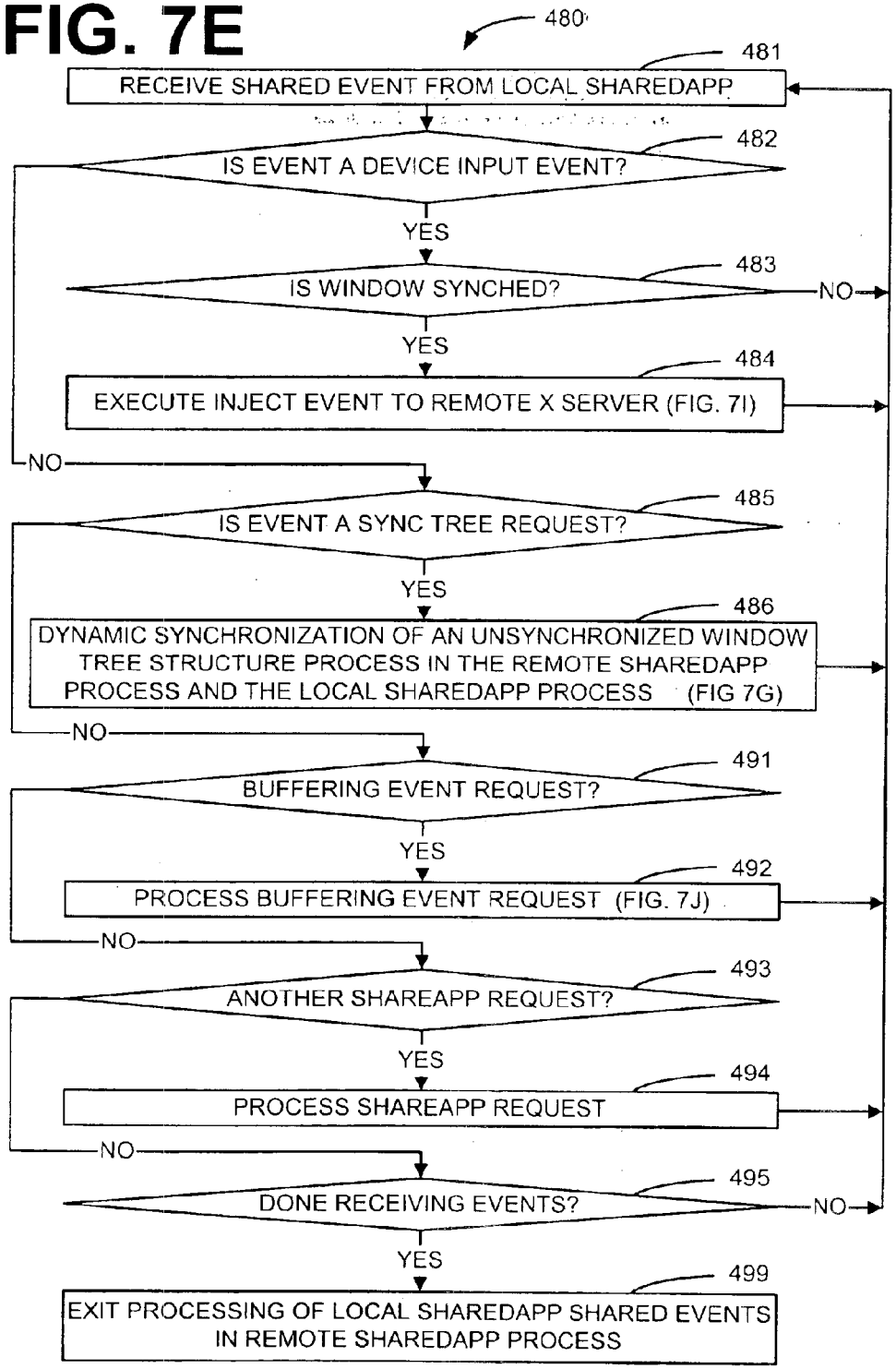

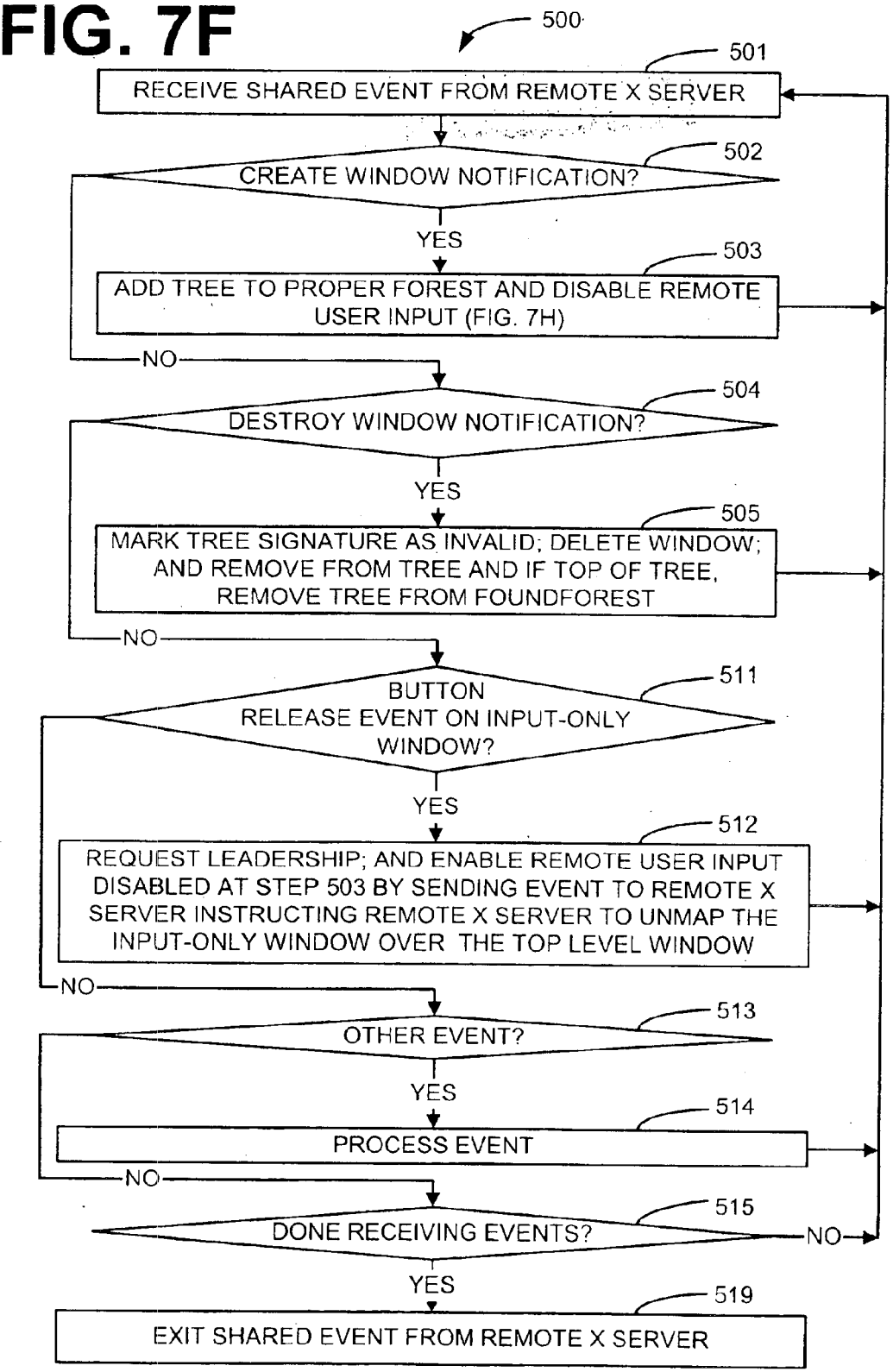

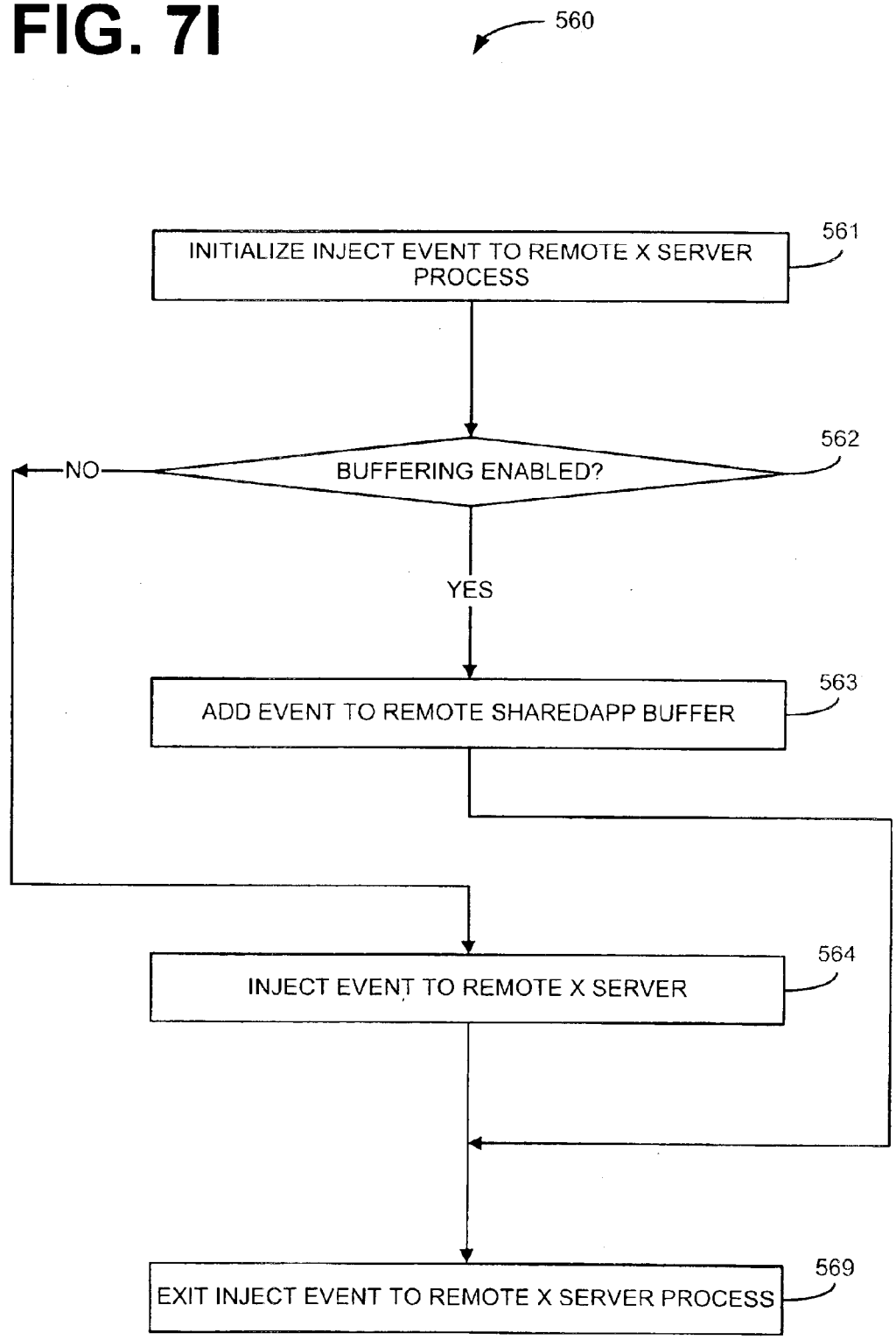

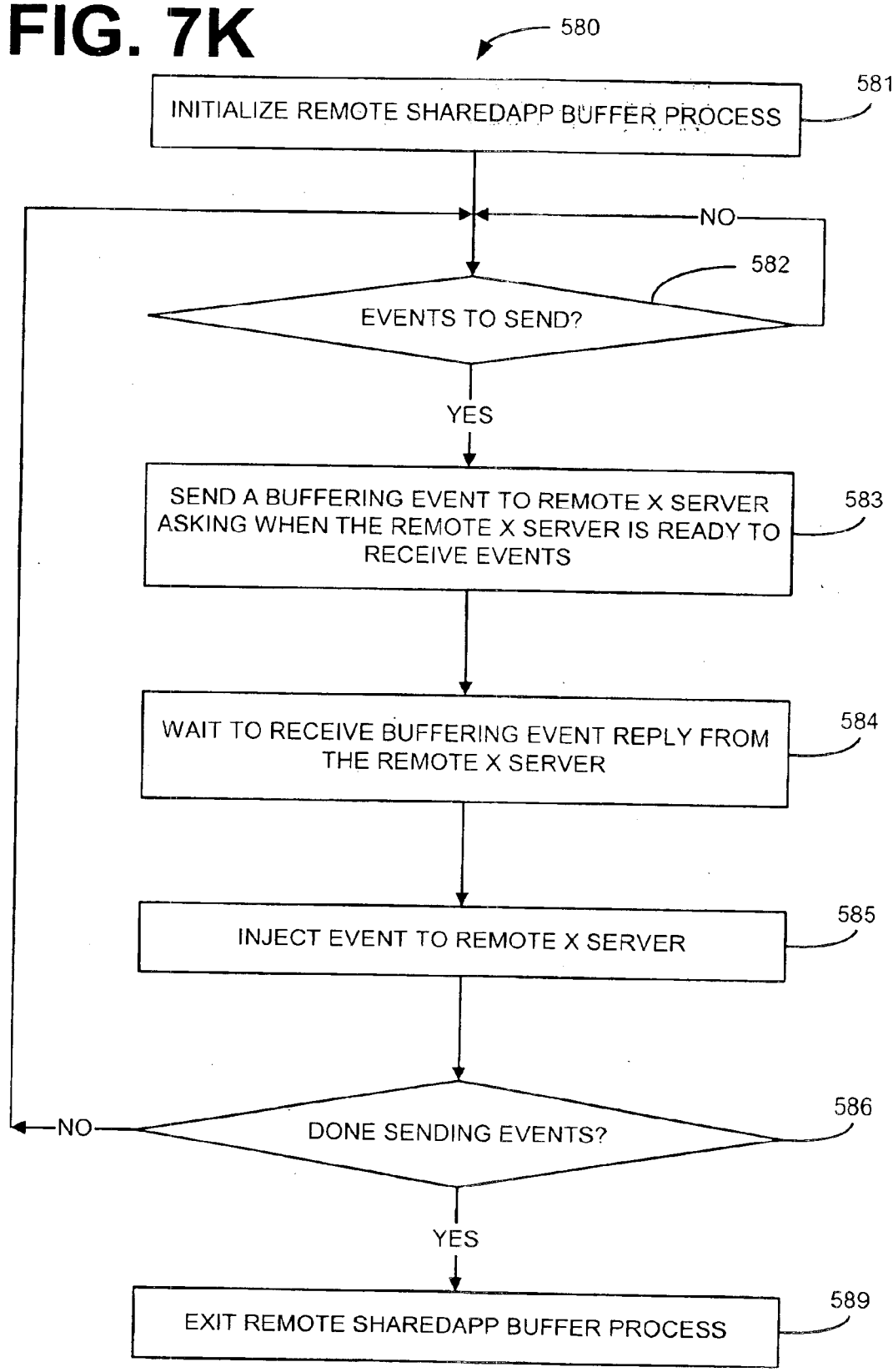

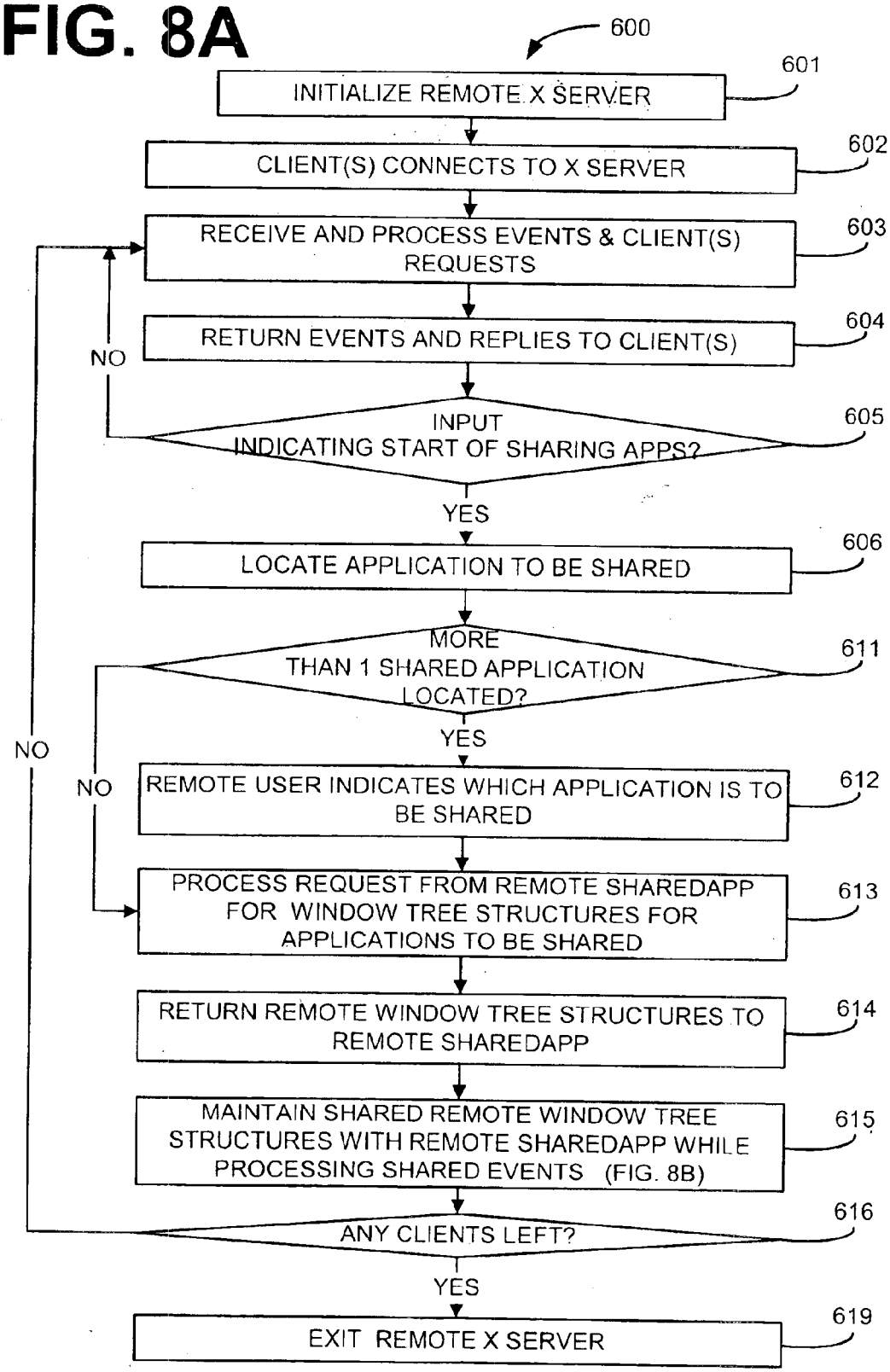

SYSTEM AND METHOD FOR PROVIDING SYNCHRONIZATION VERIFICATION OF MULTIPLE APPLICATIONS ACROSS REMOTE SYSTEMS

TECHNICAL FIELD

The present invention is generally related to computer systems and software that support substantially concurrent viewing and the ability to exchange electronically captured multidimensional graphics or text among multiple users and, more particularly, is related to a system and method for providing synchronization verification of multiple applications across remote systems.

BACKGROUND OF THE INVENTION

Industries that manufacture motor vehicles, airplanes and other complex mechanical equipment require designers and engineers to work concurrently on the same large complex design. The ability to work concurrently on the same design allows multiple users to collaborate on design changes in real-time and both reduce the overall design time and improve the quality of the final designed product.

Computer systems allow designers and engineers to electronically capture and manipulate multidimensional design graphics. The computer software that electronically captures, displays and manipulates graphics displayed on a computer screen is generally referred to as an application program or application. For more than one user to view or work on the same electronically captured image, 3-D intensive graphic, text, or set of numbers at the same time, the application must be shared with each user workstation site. The shared application should provide concurrent and consistent views of the same design images or graphics in real-time at remote user workstations. This changing design trend from sequential to concurrent processed design efforts can improve productivity. To address this evolution, systems and methods must be capable of simultaneously sharing and managing dynamic execution of multiple existing applications at remote workstations.

For graphical user interfaces (GUIs), most applications support two types of windows processes as taught in Halogenation et aL, "The BERKOM Multimedia Collaboration Service," *ACM Multimedia* 93 (1993), Gutekunst et aL, "A Distributed and Policy-Free General-Purpose Shared Window System," IEEE (1995), pages 51–61; and Nye, *XLib Programming Manual*, O'Reilly & Associates, Inc. (1992).

A first window process-type is an accessible or static window process, which is directly accessible by use of an input device such as a keyboard, mouse or other pointing device that actuates, for example, virtual buttons or sliders. A second window process-type is an inaccessible or hidden window-process, for example, pop-up or pull-down menu items, which are generally not directly accessible. An inaccessible process refers to any hidden process such as a menu item that cannot dynamically receive events managed by other processes.

Currently, shared application systems lack a sufficient means for verifying the synchronization of applications consisting of images. The current technologies for synchronization verification include the exclusive "OR" (i.e., XOR), thumbnail image, and cyclic redundancy check methods.

The exclusive "or" (XOR) method is one in which one image is laid upon another image using a logical XOR operator. If the images are identical, all the pixels will have been negated and the resulting image will be black. Any difference between the images can be readily identified. A disadvantage with the XOR methodology is that the method requires significant bandwidth, and is inefficient for automated verification of multiple applications. This method is especially inferior for collaborative sessions occurring across low bandwidth connections.

The thumbnail image method includes the use of thumbnail images, which are smaller representations of the original image. Typically, the thumbnail image is an image that is one to two inches in size. Users are then required to visually compare the application image against the thumbnail image and decide whether the images are synchronized. The major problem with the thumbnail image method is that thumbnail images are only approximations and cannot be used to accurately determine whether the applications are synchronized. This methodology also requires that the user make the determination from visual representations. This user interaction creates the inefficiency and inaccuracy in the thumbnail image method.

Another current method for verifying synchronization of applications, is through the use of the cyclic redundancy check (CRC), which is similar to, but more complex than a check sum comparison. The CRC method calculates a unique integer number per image. These unique integer numbers are then used to compare the images. If the numbers are identical, the pictures are assumed to be identical. The problem in utilizing the CRC method is that the CRCs are best suited for automated verification across bandwidth connections, but are limited in that they only detect when the images have lost synchronization. CRCs do not provide any indication that the applications themselves may be out of synchronization even though the images are identical. Currently, designers lack the capability to provide synchronization verification of multiple applications across the remote system.

Thus, a heretofore unaddressed need exists in the industry to address the aforementioned deficiencies and inadequacies.

SUMMARY OF THE INVENTION

The present invention provides a system and method for providing synchronization verification of multiple applications across remote systems.

Briefly described, in architecture, the system can be implemented as follows. The system has local application sharing logic (i.e., a local sharedapp) configured to receive events to be shared from a local application having at least one local application window, and to transmit the events to be shared to remote application sharing logic (i.e., a remote sharedapp). The remote application sharing logic receives events to be shared from the local application sharing logic, and transmits the events to at least one corresponding remote application for processing. The corresponding remote application has at least one remote application window. A window synchronization verification logic correlates the local application window with the remote application window.

The present invention can also be viewed as a method for synchronization verification of multiple applications across remote systems. In this regard, the method can be broadly summarized by the following steps: (1) selecting a local application, including at least one local application window, to share events with at least one corresponding remote application, including at least one remote application window; (2) transmitting shared events from the local application window to the remote application window for processing; and (3) verifying synchronization of the local application window with the remote application window.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram illustrating an example of the process interaction between the local X server, local sharedapp and local clients processes, and remote X server, remote sharedapp and remote clients processes.

FIGS. 5A and 5B are flow charts collectively illustrating an example of the local X server in the example window correlation system, as shown in FIGS. 1, 2, 3A and 4.

FIG. 6A is a flow chart of an example of the local sharedapp process in the example Window correlation system, as shown in FIGS. 1, 2, 3A and 4.

FIG. 6B is a flow chart of an example of the build local window tree structure process in the local sharedapp process in the example window correlation system, as shown in FIG. 6A.

FIG. 6C is a flow chart of an example of the window tree structure static synchronization process in the local sharedapp process in the example window correlation system, as shown in FIG. 6B.

FIG. 6D is a flow chart of an example of the share events process in the local sharedapp process in the example window correlation system, as shown in FIG. 6A.

FIG. 6E is a flow chart of an example of dynamic window tree structure build process for an unsynchronized window in the local sharedapp process in the example window correlation system, as shown in FIG. 6D.

FIG. 6G is a flow chart of an example of the send device-input event process in the local sharedapp process in the example window correlation system, as shown in FIG. 6D.

FIG. 7A is a flow chart of an example of the remote sharedapp process in the example window correlation system, as shown in FIGS. 2, 3B, and 4.

FIG. 7D is a flow chart of an example of the share events process in the remote sharedapp process in the example window correlation system, as shown in FIG. 7A.

FIG. 7E is a flow chart of an example of the processing of local sharedapp events in the remote sharedapp process in the example window correlation system, as shown in FIG. 7D.

FIG. 7F is a flow chart of an example of the processing of remote X server event's process in the remote sharedapp process in the example window correlation system, as shown in FIG. 7D.

FIG. 7I is a flow chart of an example of the inject event to remote X server process in the remote sharedapp process in the example window correlation system, as shown in FIG. 7E.

FIG. 7K is a flow chart of an example of the remote sharedapp buffer process in the remote sharedapp process in the example window correlation system, as shown in FIG. 7J.

FIGS. 8A and 8B are flow charts collectively illustrating an example of the remote X server in the example window correlation system, as shown in FIGS. 1, 2B, 3, and 4.

DETAILED DESCRIPTION OF THE PREFERRED EMBODIMENT

Figure 1:
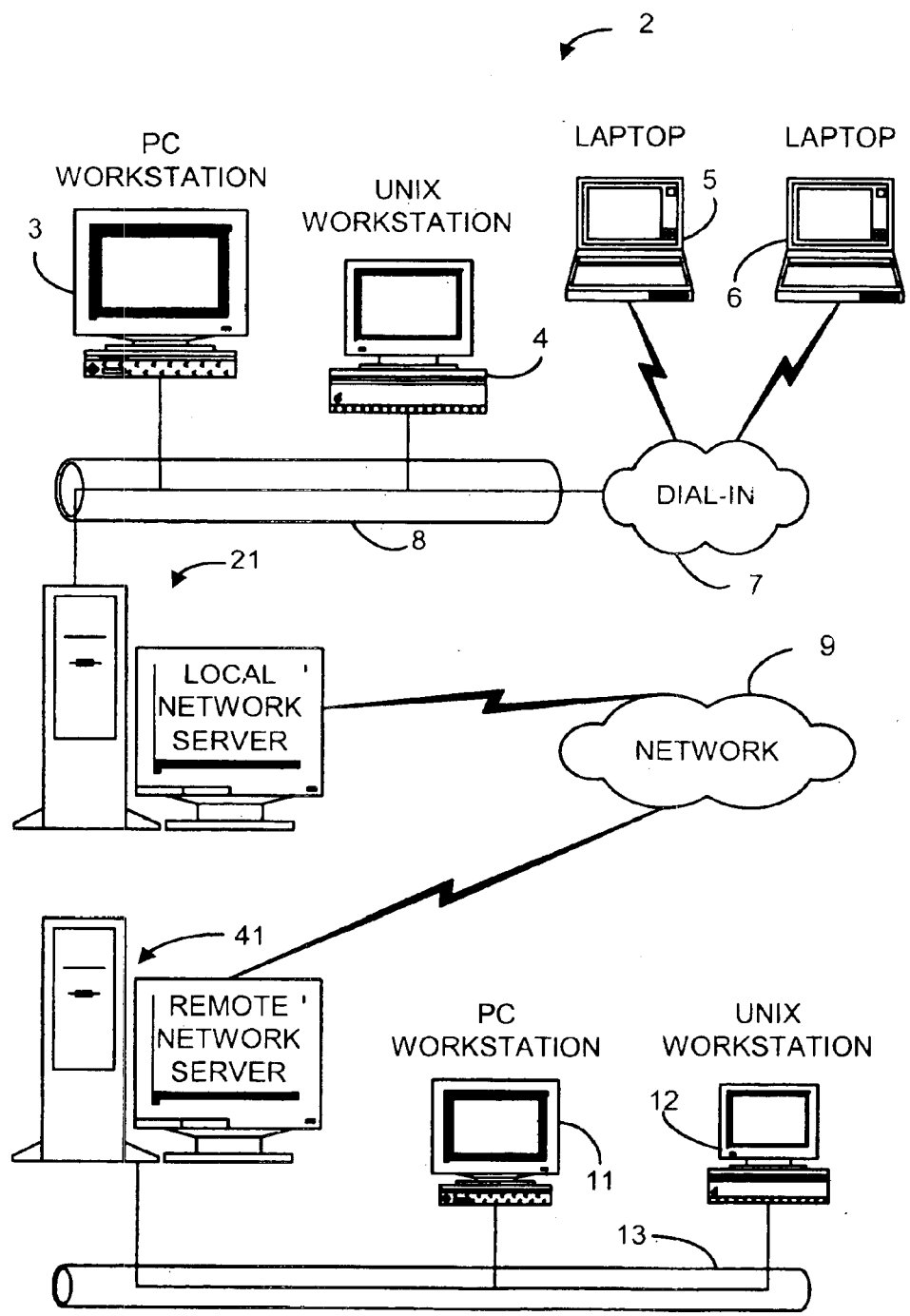
FIG. 1 is a block diagram illustrating an example of the architecture of the local and remote client/server systems.

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention provides a system and method for providing synchronization verification of multiple applications across remote systems. A major benefit of the present invention is that in a collaborative environment where multiple users are working together, it provides automated real time feedback as to the synchronization of all applications in the collaborative session. The system and method of the present invention also provides the ability to lock out the leader application if one or more of the collaborative remote applications loses synchronization. The system and method of the present invention operates using a low bandwidth connection and can operate in a transparent manner.

The system and method for synchronization verification of multiple applications across remote systems requires that all windows associated with an application in a collaborative session be correlated with windows in other applications in remote systems. Applications typically have dozens of windows associated with them. What may appear as a single window to a user, often expands into multiple windows internally. Each time the window manager (i.e., motif window manager) detects a creation of a window, the window manager re-parents the window. These added windows serve as window decorations and enable the user access to functions for managing windows (e.g., economize, maximize and resize). The important fact is that each of the windows in the application receives indexes. These indexes allow the system and method for synchronization verification to locate the corresponding window on remote systems in the collaborative session.

The first part of ensuring synchronization between multiple applications is in the monitoring of the number of windows that have been created by these applications. In the example that will be described, this monitoring of the number of windows that have been created will be accomplished using an X record extension. With this extension, the X server notifies the shared app processes each time a client creates or destroys a window. As long as the images and window counts of the respective applications match, they are synchronized. If the window counts differ, it is because the remote application is either lagging behind (i.e., it has not created its windows) or it has missed or misinterpreted an event. The system and method for synchronization verification eliminates the delay by waiting to index new windows until an actual event is received. This allows all the participating applications time to create required windows. By detecting an error at the earliest possible time (i.e., even before rendering of data has occurred), the system and method allows the user to resynchronize before the local and remote applications diverge.

Another embodiment of the synchronization verification system and method is in the checking of the CRC values for the windows that are actually rendered. This allows the system and method to ignore those windows, such as menus, push buttons, etc. that are static. Utilization of the CRC values also allows the system and method for synchronization verification to ignore differences caused by user preferences, such as different fonts or colors. One problem is to identify which windows are actually rendering. In the example illustrated herein, this has been implemented by using an extension to the X server that wraps rendering procedures. When the application renders a window, the extension is notified and remembers the window ID. With the appropriate list of windows, the system and method for synchronization verification is in a position to calculate periodic CRC values and send these CRC values to each participant for comparison.

Each packet contains a CRC integer value in an index (i.e., an integer), which represents the window D. Each participant's sharedapp process indicates whether or not the comparison succeeded, and if not, provides some estimate as to how much the image differs. If the synchronization verification of the present invention exceeds a predetermined threshold, the lead application will be locked out from continuing until the lead application user acknowledges the problem, and either chooses to ignore or correct the problem.

Event sharing collaboration is accomplished by being able to correlate all window trees in an entire forest of window trees within an application's entire set of windows, and being able to correlate window trees that are dynamically created, changed, and destroyed while the application is running. The tree is a data structure used to organize the windows within the window mapping process. Windows have parents, siblings, and children. Windows can be organized in terms of window trees, where there can be a treetop, and the top most window is the root.

The forest is a structure that ties together all of the window trees that currently exist within an application. One or more trees represent a forest. There are two forests created for each application that is shared: the foundforest and the lostforest.

The foundforest and lostforest are structures of the forest structure that exist for each shared application. The foundforest contains window trees that have been correlated. In other words, each of the windows within their respective trees in the foundforest have been mapped to their corresponding set of windows that exist in each of the remote application's foundforest. The lostforest contains window trees that have been created by the application, but have not yet been mapped. The forest structure contains the following information: (1) the head or first tree in the forest; (2) the tail or the last tree in the forest; (3) the current number of trees in the forest, which is a dynamic variable that changes as windows and trees come and go during dynamic mapping, and (4) various member functions that are used to add and delete window trees, etc.

Window correlation is the primary mechanism that allows the event sharing collaboration system to operate. The event sharing collaboration system of the present invention is aimed at high-performance collaboration. Device-input events, such as for example, but not limited to, mouse and keyboard inputs, are the events being shared. Input events come in various types that include for example, but are not limited to, mouse movements (MotionNotify in the example of X windows), mouse button presses and releases (ButtonPress and ButtonRelease MotionNotify in the example of X windows), and keyboard presses and releases (KeyPress and KeyRelease MotionNotify in the example of X windows). Events are also associated with windows. For example, when a mouse button is pressed and held down, and then dragged across a window to rotate a part of an assembly, one ButtonPress event and many MotionNotify events are being generated in the X windows system example for the window.

The event sharing collaboration system requires the application that is being shared to execute on each of the systems that are part of the collaboration session. This is called a multiple application instantiation model, as opposed to a single application instantiation model, which requires only one instantiation of the application to be running.

With multiple instantiations of an application running at the same time, only input events need to be shared between the applications for collaboration to take place. The event sharing system requires significantly less network bandwidth than any other collaboration model. Expensive 2D/3D protocol or frame buffer pixels are not shared. For example, when the user clicks on a GUI icon to rotate a part 90 degrees, the button-press event is sent to the remote systems to be applied to the corresponding icon on the remote application. Since very little data is shared, interactivity during the collaboration session is in most cases unimpeded.

However, in order for the event sharing to work properly, the multiple instantiations of the applications must act as if they were being driven by a single local keyboard and mouse. This can be accomplished if the input events that are associated with a local window are shared to the same corresponding window in each of the remote applications.

In effect, the window correlation system of the present invention is the mechanism that allows it to appear as if the keyboard and mouse are local to each of the remote applications. In reality, window correlation is the process of finding a mapping between a certain set of windows in one application (e.g., a pulldown menu) and the corresponding set of windows that exist in the remote shared application(s).

The window correlation system of the present invention described herein addresses two main processes: static window correlation and dynamic window correlation. The three terms "window correlation," "window synchronization," and "window mapping" can all be used interchangeably.

Static window correlation occurs when the user initially picks the application that is to be shared. The windows that currently exist within the application, (i.e., those that have already been created), are considered, for the purposes of event sharing, static windows. These static windows must be correlated with their corresponding set of windows that exist in the remote applications. This static mapping generally occurs only once, at the beginning when the user starts the application sharing session by selecting a window. Static window correlation is herein defined in further detail with regard to FIGS. 6A through 6C and 7A through 7C.

Dynamic window correlation refers to the process of correlating windows that are created, remapped, and destroyed while the application is being shared. These windows also must be dynamically correlated with their corresponding set of windows that exist in the remote application(s). The dynamic window correlation process is herein defined in further detail with regard to FIGS. 6D through 6F and 7D through 7H.

The window correlation system of the present invention provides these capabilities on any arbitrary operating system such as, for example, but not limited to, Unix, Windows, HP-UX, Windows NT, Mac OS, and the like, and also provides improved performance over the prior art methodologies of window sharing.

The flow chart of FIGS. 5A through 8B show the architecture, functionality, and operation of a possible implementation of the window correlation system 60 software referenced in FIGS. 5A through 8B. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two groups of blocks (i.e., 362–363 and 364–365) shown in succession in FIG. 6I may in fact be executed substantially concurrently or the blocks may sometimes be executed in the reverse order, depending upon the functionality involved, as will be further clarified hereinbelow.

Turning now to the drawings, FIG. 1 is a block diagram illustrating an example of the architecture of the local and remote client/server systems. This exemplar configuration illustrates the flexibility, expandability, and platform independence of the present invention. While the system configuration could take many forms, the diagram of FIG. 1 illustrates a plurality of diverse workstations 3, and 4 connected to a network 8. Additional workstations 5 and 6 may similarly be remotely located and in communication with the network 8 through a dial-in 7 or other connection. Each of the workstations in FIG. 1 is uniquely illustrated to emphasize that user workstations may comprise a diverse hardware platform.

Additional workstations 11 and 12 may similarly be located and in communication with the remote network server 41 for access to data on the local network server 21 and the remote network server 41. Workstations 11 and 12 communicate with the remote network server 41 over a network 13.

Networks 8 and 13 may be, for example but not limited to, dial-in network, LAN, WAN, PSTN, Intranet, Internet and Ethernet type networks, also known as 10 BASE 2, 10 BASE 5, 10 BASEF, 10 BASET, BASE BAN network, and the like. The local network server 21 and workstations 3–6, connected to the local network server 21, communicate with the remote network server 41 and workstations 11 and 12, connected to the remote network server 41, over a network 9. Network 9, may be for example, but not limited to, a LAN, WAN, Ethernet, PSTN, Intranet/Internet communication links, and the like.

Illustrated in FIG. 2 is a block diagram illustrating an example of the process interaction of the window correlation system 60 of the present invention. The interaction of the window correlation system 60 is between the local X server 100, local sharedapp process 200 and local clients 33X processes, and remote X server 600, remote sharedapp process 400 and remote clients processes 53X, as shown in FIG. 2. The local sharedapp process 200 is a local application sharing logic, and the remote sharedapp process 400 is a remote application sharing logic.

The user of keyboard 25 and mouse 24 is said to be driving the session. The user that controls the keyboard and mouse is called the "leader." All other users that are participating in the collaboration session at remote systems are called "listeners." The keyboard 25 and mouse 24 is attached to the local X server 100, which controls the input events coming from these input devices.

The input is generally directed to a client or application 33X that is being driven by the user through a connection to the local X server 100. Notice that the local client 33X and local X server 100 communicate with each other through the standard X protocol, which is made up of X requests, X replies, and X events and is known to those skilled in the art. The application on the left side of FIG. 2 is called the local client A 33X process, and the other application instantiation on the right side of FIG. 2 that is part of the collaboration session is called the remote client A 53X process.

One example of a sharable client or application is OpenGL. OpenGL is a software interface to graphics hardware. As known in the art, OpenGL's interface consists of about 120 distinct commands, which a user could utilize to specify the objects and operations needed to produce an interactive 3-dimensional display. In this example, client process OpenGL routines are generally designed to be hardware independent interfaces that are implemented on many different hardware platforms.

It is the local sharedapp process 200 and remote sharedapp process 400 that represent the processes that provide the collaboration capabilities. These processes are separate processes, and for the purposes of this disclosure, are called the window correlation system 60. The local sharedapp process 200 is responsible for sharing the real input events to all other remote sharedapp processes 400. Note that the local sharedapp process 200 is responsible for capturing a copy of all input events and relaying them to the remote applications.

A network 9 represents the connection between the local network server 21 (FIG. 1) and remote network server 41 (FIG. 1). The right side of FIG. 2 represents the same set of processes described above running on one or more remote systems. The local sharedapp process 200 and remote sharedapp process 400 communicate across network 9 using a sharedapp protocol. The sharedapp protocol allows the local X server 100, through the local sharedapp process 200, to communicate with multiple remote X servers 600 through multiple remote sharedapp processes 400. The communication is two way and there is a set of protocol requests and a set of protocol replies.

Figure 3A:
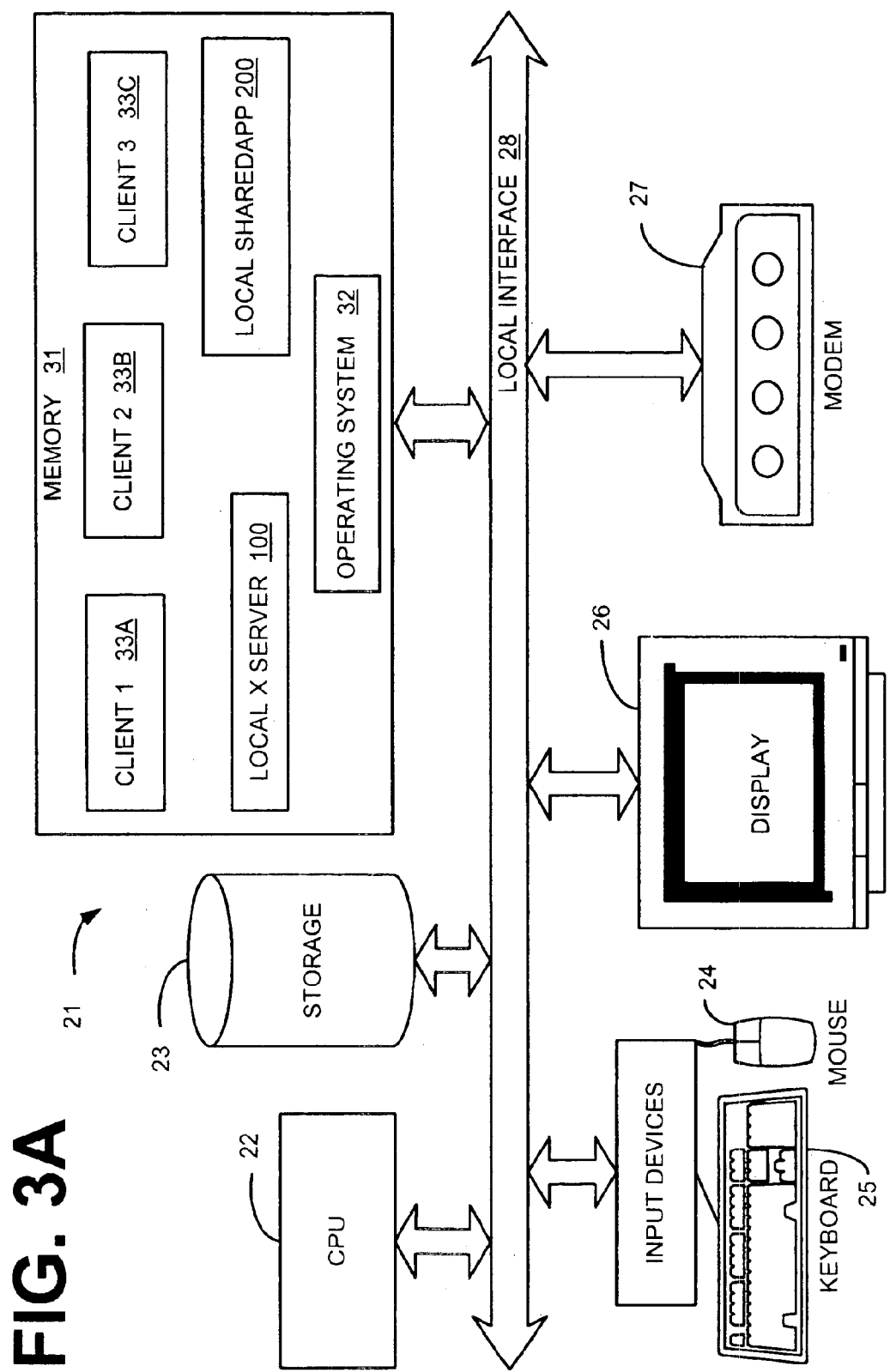
FIG. 3A is a block diagram illustrating an example of a local X server, local shared application and local clients processes, situated within a computer readable medium, for example, in a computer system of the local server.

Illustrated in FIG. 3A, is a block diagram illustrating an example of a local network server 21, including a local X server 100, local sharedapp process 200 and local clients 33(A–C) processes, for example, within a computer readable medium, such as memory 31.

Server systems today, such as local network server 21, access and process client applications or resources, required by a local user by using the central processor unit 22, storage device 23, and memory 31 with an operating system 32. The processor accepts data from memory 31 and storage device 23 over a local interface 28 (i.e., a bus). Directions from the local user can be signaled to the local network server 21 by using the input devices such as mouse 24 and keyboard 25. The actions input and results output are displayed on a display device such as, but not limited to terminal 26. The local network server 21 provides access to communication facilities via modem 27 to transport commands from the local user to other resources connected to the network 9.

As discussed above, the local X server 100 controls the input events coming from the input devices and the local clients 33A–33C that include sets of routines used to direct the performance of procedures and/or subroutines required by the user. The local sharedapp process 200 represents the process that provides the collaboration capabilities for the local X server process.

Figure 3B:
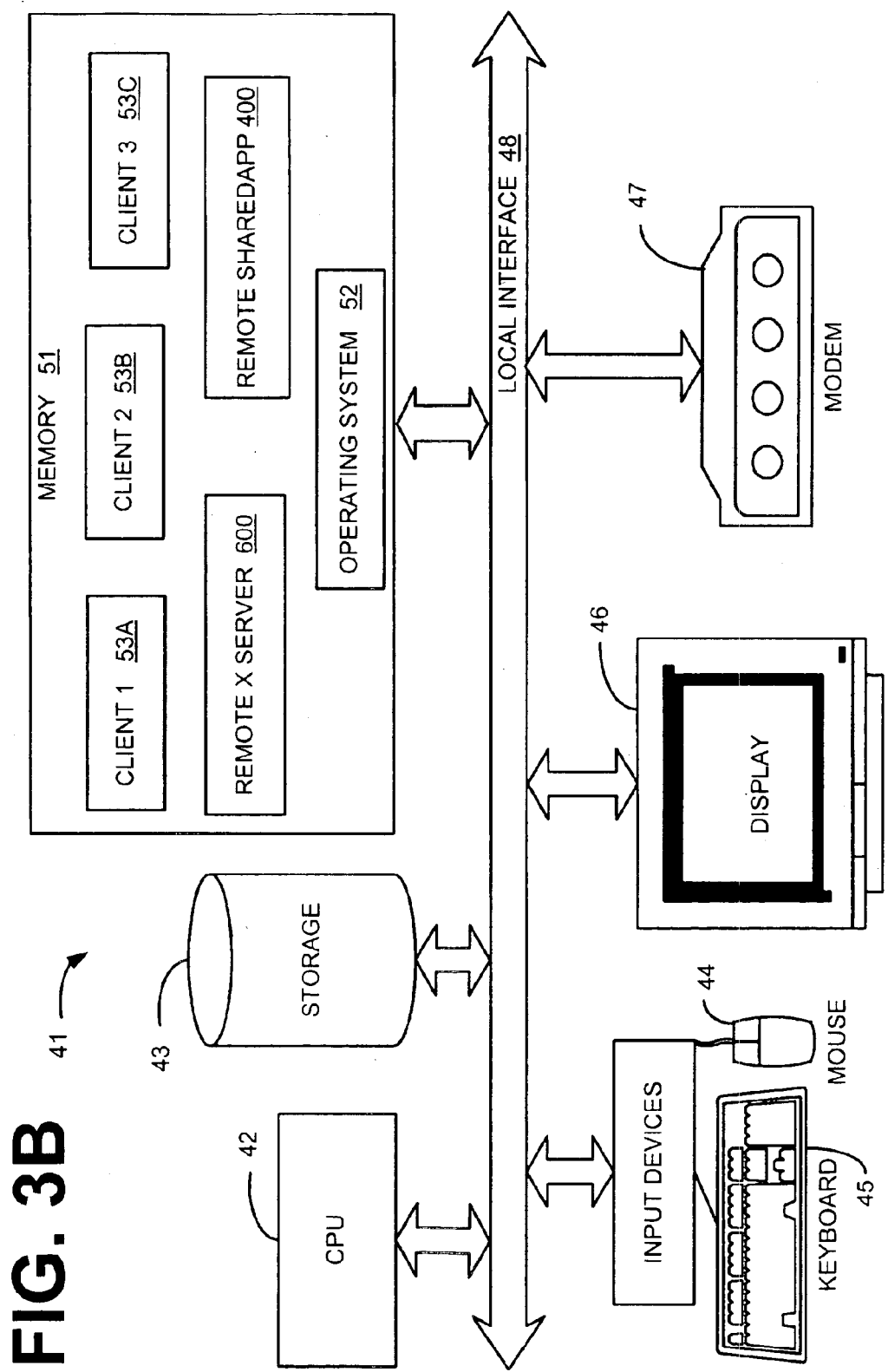
FIG. 3B is a block diagram illustrating an example of a remote X server, remote sharedapp and remote clients processes, situated within a computer readable medium, for example, in a computer system of the remote server.

Illustrated in FIG. 3B is a remote network server 41, including a remote X server 600, remote sharedapp process 400 and remote client's 53A–53C processes, for example, within a computer readable medium such as memory 51. The architecture of the remote network server 41 is similar to that of the local network server 21. The functionality of processor 42, storage device 43, mouse 44, keyboard 45, display 46 and modem 47 are essentially the same as corresponding items of FIG. 3A described above.

As discussed above, the remote sharedapp process 400 accepts the incoming events from the local sharedapp process 200, and passes the events to the remote X server 600. These events are processed using the remote clients 53A–53C processes and are then output to a remote user.

Figure 4:
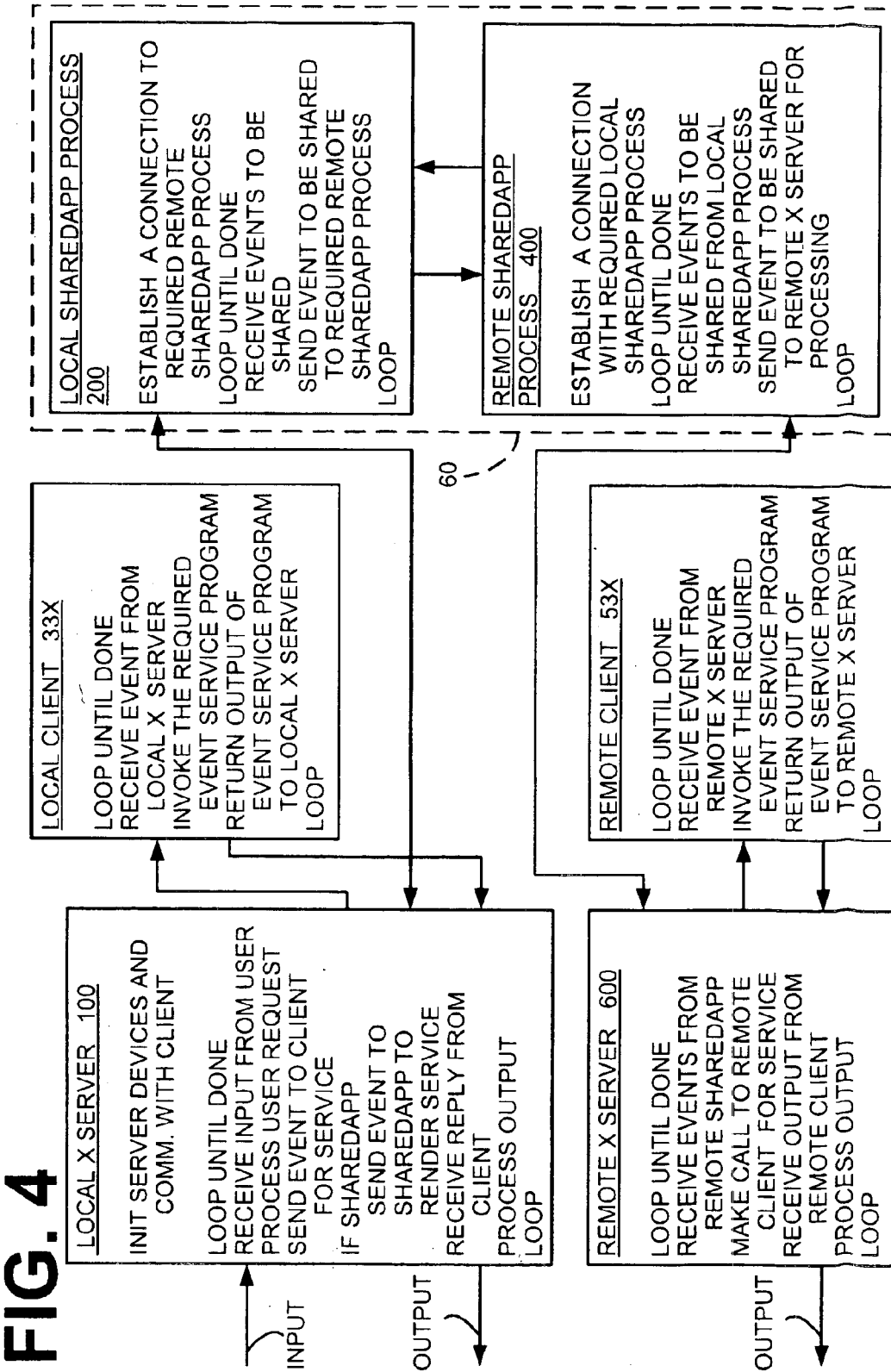
FIG. 4 is a block diagram illustrating, in further detail, an example of the process interaction between the local X server, local sharedapp logic and local clients processes, and remote X server, remote sharedapp logic and remote clients processes, for the events issued by a local user that are intercepted by the local sharedapp logic for reporting to the remote sharedapp logic, as shown in FIGS. 2, 3A, and 3B.

Illustrated in FIG. 4 is a block diagram illustrating in further detail, an example of a window correlation system 60. Shown is the interaction of the window correlation system 60 for the events issued by a local user to a local X server, that are intercepted by the local sharedapp process 200 for reporting to the remote sharedapp process 400, as shown in FIG. 2.

As shown, a user can input a command and receive output from a local X server 100. The local X server 100 receives this input from the user and processes the user request. The local X server 100 sends an event to a local client 33X for servicing the user request. If sharedapp functionality is enabled, the local X server 100 also sends the event to the local sharedapp process 200 to render service. The local X server 100 then receives a reply from the local client 33X, processes the output, provides the user with the output and loops to receive the next input from the user.

The local client 33X is a process that waits to receive events from a local X server 100 and then invokes the appropriate event service program to service the event. Once the event service program is completed, the local client 33X returns the output of the event service program to the local X server 100 and then waits to receive the next event from the local X server 100.

The window correlation system 60 of the present invention includes two processes. A local sharedapp process 200 and a remote sharedapp process 400. The local and remote sharedapp processes establish and maintain communication with the local X server 100 and a remote X server 600 for sharing windows and processing events. The local sharedapp process 200, upon startup, establishes a connection with the corresponding remote sharedapp process 400. The local sharedapp process 200 then waits to receive events to be shared from the local X server 100. Upon receiving the event from the local X server 100, the local sharedapp process 200 sends the event, by unicast or multicast, to be shared to each of the required remote sharedapp process 400. The local sharedapp process 200 then returns and waits to receive the next event to be shared.

The remote shareapp process 400, upon startup, also establishes the connection with the corresponding local sharedapp process 200. Upon establishing the connection, the remote sharedapp process 400 waits to receive events to be shared from the local sharedapp process 200. Upon receiving an event from the local sharedapp process 200, the remote sharedapp process 400 sends the event to be shared to the remote X server 600 for processing. The remote sharedapp process 400 then returns to wait and receive the next event from the local sharedapp process 200.

The remote X server 600 waits to receive events from the remote sharedapp process 400. The remote X server 600 upon receiving an event from the remote sharedapp process 400, makes a call to the remote client 53X for servicing the event. The remote X server 600 then receives output from the remote client 53X and outputs the appropriate data to the remote user.

The remote client 53X waits to receive an event from the remote X server 600. Upon receipt of an event, the remote client 53X invokes the required event service program and returns the output of the event service program to the remote X server 600. After return of the output, the remote client 53X loops and awaits receipt of the next event from the remote X server.

The local and remote X servers 100 and 600, respectively, are herein defined in further detail with regard to FIGS. 5A and 5B, and 8A and 8B, respectively. The local sharedapp process 200 and remote sharedapp process 400 are herein defined in further detail with regard to FIGS. 6A through 6F, and 7A through 7H, respectively.

Illustrated in FIGS. 5A and 5B are flow charts of an example of the local X server 100 in the window correlation system 60. First, the local X server 100 is initialized at step 101. Next, the local clients 33X connect to the local X server 100 at step 102. At step 103, the local X server 100 receives and processes user and client requests. When the local X server 100 receives a request for service from a local user, the local X server 100 sends an event to the local client 33X for processing as previously discussed with regard to FIGS. 3 and 4. Upon completion of the processing of the event, the client 33X returns the event and replies to the local X server 100 at step 104. The local X server 100 also returns any replies or output to the local user at step 104.

At step 105, the local X server 100 determines if input from the local user indicates the desire for sharing applications. If the input does not indicate the sharing of applications, the local X server 100 returns to repeat steps 103 through 105 above.

However, if the local X server 100 determines at step 105 that the input indicates that sharing of applications is desired, at step 106 the local X server 100 accepts input from the user indicating which applications are to be shared. At step 111 the local X server 100 determines if the applications that the user indicated the desire to share are enabled for sharing. If the applications that the user indicated at step 106 are not enabled for sharing, the local X server 100 returns to repeat steps 103 through 105.

If the applications that the user indicated to be shared are enabled for sharing, the local X server 100 indicates, at step 112, the applications selected to be shared with the local sharedapp process 200. The local X server 100 receives a request from the local sharedapp process 200 for the local window tree structures for applications to be shared at step 113. At step 114, the local X server 100 returns the local window tree structures to the local sharedapp process 200.

At step 115, the local X server 100 maintains the local window tree structures with the local sharedapp process 200 while processing shared events. This process is herein defined in further detail with regard to FIG. 5B.

At step 116, the local X server 100 determines if there are any clients left sharing events. If there are clients left sharing events, the local X server 100 returns to repeat steps 103 through 116. If there are no clients left to share events, the local X server 100 exits at step 119.

Illustrated in FIG. 5B is the sharing events process 120 on the local X server 100 referenced in FIG. 5A. At step 121 in FIG. 5B, the sharing events process 120 receives and processes the client request. At step 122 the sharing events process 120 returns events and replies to the local client 33X.

At step 123, the sharing events process 120 determines if a shared window has been deleted during the processing of the client request received at step 121. If it is determined at step 123 that no shared window was deleted, the shared events process 120 proceeds to step 125. If it is determined at step 123 that a shared window was deleted during the processing of the client request at step 121, the shared events process 120 deletes the window and sends a delete window event to the local sharedapp process 200 at step 124.

At step 125, the sharing events process 120 determines if a new shared window has been created. If a new shared window has not been created the sharing events process 120 skips to step 127, to determine if there was a device-input event. If the sharing events process 120 determines that a new shared window was created during the processing of the client request at step 121; the sharing events process 120 creates the appropriate window structure and sends a create window event to the local sharedapp process 200 at step 126.

At step 127, the sharing events process 120 determines if a device-input event was processed at step 121. If a device-input event was not processed at step 121, the sharing events process 120 skips to step 132 to make a determination if the sharing events process 120 is done sharing events. If the sharing events process 120 determines that the client request input at step 121 was a device-input event, the sharing events process 120 sends a device-input event to the local sharedapp process 200 at step 131.

At step 132, the sharing events process 120 then determines if the sharing events process 120 is done sharing events. If the sharing events process 120 is not done sharing events, the sharing events process 120 loops back to repeat steps 121 through 132. If the sharing events process 120 is done sharing events, the sharing events process 120 exits the sharing events process 120 on the local X server 100 at step 139.

Illustrated in FIG. 6A is a flow chart of an example of the local sharedapp process 200 in the window correlation system 60 of the present invention. The local sharedapp process 200 is first initialized at step 201. The local sharedapp process 200 then waits to receive a command from the local X server 100 to share applications at step 202. The local sharedapp process 200 builds the local window tree structures with the local X server 100, and synchronizes these tree structures with the remote sharedapp process 400. This building and synchronization of tree structures occurs at step 203 and is herein defined in further detail with regard to FIG. 6B.

The local sharedapp process 200 next determines if the number of visible windows not synchronized is greater than zero at step 204. If there are no visible windows that were not synchronized at step 203, the local sharedapp process 200 skips to step 206. If it was determined at step 204 that the number of visible windows not synchronized was greater than zero, at step 205, the local sharedapp process 200 displays a warning message to the local and/or remote user(s) indicating that the local and remote window trees for the shared applications are in different states.

At step 206, the local sharedapp process 200 starts sharing events with the remote sharedapp process 400. This dynamic sharing of events is herein defined in further detail with regard to FIG. 6D. The local sharedapp process 200 periodically determines if it is desirable to continue sharing applications at step 207. If it is determined that it is desirable to continue sharing applications, the local sharedapp process returns to repeat steps 206 and 207. If it is determined at step 207 that the local sharedapp process 200 should not continue the application sharing, the local sharedapp process 200 informs the remote sharedapp process 400 and the local X server 100 to stop sharing the current application at step 209. The local sharedapp process 200 then returns and waits to receive a share applications command from the local X server 100 at step 202.

Illustrated in FIG. 6B is a flow chart of an example of the build and synchronize window tree structure process 220 in the local sharedapp process 200 in the window correlation system 60, referenced in FIG. 6A.

With regard to FIG. 6B, the build and synchronize window tree structure process 220 requests the current state of window trees for windows to be shared from the local X server 100, at step 221. The build and synchronize window tree structures process 220 receives the current state of the window trees from the local X server 100 at step 222. At step 223, the build and synchronize window tree structure process 220 identifies all the top-level application windows. At step 224, the build and synchronize window tree structure process 220 instructs the local X server 100 to create an input-only window for each top level application window.

At step 225, the build and synchronize window tree structure process 220 instructs the local X server 100 to re-parent (i.e., place) the input-only window on top of the top-level application windows. This is done so that any user input directed towards this shared application will now be intercepted by the input-only window. At step 226, the build and synchronize window tree structure process 220 instructs the remote sharedapp process 400 to locate the remote shared application on the remote X server 600.

At step 227, the build and synchronize window tree structures process 220 performs a static synchronization of tree structures for windows and applications in the local sharedapp process 200 and the remote sharedapp process 400. The static synchronization of tree structures process 240 is herein defined in further detail with regard to FIG. 6C.

In step 228, the build and synchronize window tree structures process 220 sends an event to the local X server 100, instructing the local X server 100 to unmap the input-only window over each top level application window created and re-parented above at steps 224 and 225. The build and synchronize window tree structures process 220 then exits at step 229.

Illustrated in FIG. 6C is a flow chart of an example of the static synchronization of tree structures process 240 in the local sharedapp process 200, referenced in FIG. 6B. The static synchronization of tree structures process 240 includes a portion of the synchronization verification system and method of the present invention.

First, referring to FIG. 6C, the static synchronization of tree structures process 240 is initialized at step 241. At step 242, the static synchronization of tree structures process 240 computes a signature for the first or next tree in the lostforest. The forest class is a class that ties together all of the window trees that currently exist within the application being shared. One or more trees represent a forest. There are two forests created for each application that is shared: the foundforest and the lostforest.

The foundforest and lostforest are objects of the forest class that exist for each shared application. The foundforest contains window trees that have been correlated. In other words, each of the windows within their respective trees on the foundforest have been mapped with their corresponding set of windows that exist in each of the remote applications. The lostforest contains window trees that have been created by the application, but have not yet been mapped.

These two objects, the foundforest and the lostforest, are two very important and heavily used window-mapping objects. The forest class contains, for example, but not limited to, the following information: (1) the head or first tree in the forest; (2) the tail or the last tree in the forest; and (3) the current number of trees in the forest. The current number of trees in the forest is a dynamic variable and changes as windows and trees come and go during dynamic mapping.

The signature computed at step 242 represents the "shape" of the window tree. The signature is used by the remote sharedapp process 400 to determine if there are window trees that match the window trees sent by the local sharedapp process 200. The signature gives the remote sharedapp process 400 the ability to determine if two trees are identical. A tree signature is used to uniquely and quickly differentiate one tree from another. If the signature is too generic, multiple trees could potentially match the same signature. The design and computation of the signature is a very important part of the synchronization verification system and method of the present invention.

A number of characteristics can be used to build a unique tree signature. The following list describes current examples that could be part of the tree signature:

(1) Tree CRC: The tree CRC is a number or data structure that encapsulates the unique characteristics of the tree. The CRC could be as simple or as complex as necessary. A simple CRC might contain just the number of windows in the tree. A more complex CRC might encode the "shape" of the tree. This would possibly contain the depth and breadth of the tree, the parent/child/sibling relationship within the tree, etc.

(2). Window properties: Other information that might go into the tree signature could be window properties. The WM-NAME property is usually a unique name assigned to each top level window. Another useful property is the MIT OBJ CLASS property. This property contains the widget class and object name of each window in the tree associated with a widget. This property is only in effect when the "*XtDebug: True" resource is set prior to application startup.

(3) Bitmap CRC for various windows within the tree: This could be used to help differentiate between multiple trees that have the same "shape." For example, consider two very similar sets of pull-down menus. Menu 1 contained 3 pickable items, each with the text of pickme 1, pickme 2, and pickme 3. Menu 2 contained 3 items with the text of pickme A, pickme B and pickime C. Each menu has the same number of child windows, so the structure of the trees corresponding to each menu is very similar. A simple signature would not be able to determine which menu should be correlated.

However, if the CRC of each child window were compared, the different text in each item would force a unique CRC, which would enable a unique signature to be computed. Another example of the CRC generation uses the different default fonts between the various remote systems within the various shared applications, causing the same menus to generate different CRCs.

(4) Viewability state of the top-level window in the tree.

(5) Bounding box of the tree.

Also, the signatures developed on Unix might be different than those developed on Microsoft Windows or other operating system.

Next, at step 243, the static synchronization of tree structures process 240 sends a synchronized tree request to the remote sharedapp process 400 asking the remote sharedapp process 400 to locate the same tree on its lostforest. The static synchronization of tree structures process 240 receives a synchronized tree reply from the remote sharedapp process 400 at step 244.

At step 245, the static synchronization of tree structures process 240 determines if the reply received at step 244 was successful and that the remote sharedapp process 400 found the corresponding tree. If the reply was not successful, then the static synchronization of tree structures process 240 skips to step 253 to proceed with the next tree in the lostforest. If the reply was successful and indicates that the remote sharedapp process 400 found the corresponding tree, then the static synchronization of tree structures process 240 indexes the tree, allocates indexes from the found window array and assigns an index for each window in the tree at step 251. The indexed tree is then placed on the foundforest list at step 252.

At step 253, the static synchronization of tree structures process 240 determines whether synchronization of every tree in the lostforest has been attempted. If the static synchronization of tree structures process 240 has not attempted to synchronize each tree in the lostforest, the static synchronization of tree structures process 240 returns to repeat steps 242 through 253.

If, at step 253, the static synchronization of tree structures process 240 has attempted to synchronize every tree in the lostforest, then the static synchronization of tree structures process 240 proceeds to step 254 and counts the number of local and remote visible windows which were not synchronized. This number of local and remote visible windows, which were not synchronized, is utilized at step 204 (FIG. 6A) to determine if a warning message should be displayed to the user indicating that the applications are in different states. This provides part of the synchronization verification system and method of the present invention for the static synchronization of tree structures. The static synchronization of tree structures process 240 then exits at step 259.

Illustrated in FIG. 6D is a flow chart of an example of the sharing events process 260 in the local sharedapp process 200 referenced in FIG. 6A.

First, referring to FIG. 6D, the sharing events process 260 receives shared events from the local X server 100 at step 261. At step 262, the sharing events process 260 determines if a new shared window was created when the local X sever 100 processed the shared event. If the sharing events process 260 determined that a new shared window was not created with the event received from the local X server 100, the sharing events process 260 skips to step 264. If the sharing events process 260 determined that a new shared window was created from the event received from the local X server 100 at step 261, the sharing events process 260 creates a window structure for the new shared window at step 263.

At step 264, the sharing events process 260 determines if the received shared event is a device-input event. If the event received at step 261 is not a device-input event, the sharing events process 260 skips to step 271. If it is determined that the event received at 261 is a device-input event, the sharing events process 260 then determines if the event is to be performed with an unsynchronized window at step 265.

If the event is not to be performed with an unsynchronized window, the sharing events process 260 skips to step 267 for continued processing. If it is determined that the event received at step 261 is to be performed with an unsynchronized window, then the sharing events process 260 proceeds to synchronize the tree containing the unsynchronized window at step 266. The dynamic synchronization of an unsynchronized window tree structure process 300 is herein defined in further detail with regard to FIG. 6F.

At step 267 in FIG. 6D, the sharing events process 260 sends the device-input event to the remote sharedapp process 400. The sending of the device-input event to the remote sharedapp process 400 is herein defined in further detail with regard to FIG. 6G.

At step 271 in FIG. 6D, the sharing events process 260 determines if a shared window was deleted when the local X sever 100 processed the shared event. If a shared window was, riot deleted, then the sharing events process 260 proceeds to step 273 to determine if processing of shared events is complete. If the sharing events process 260 determines at step 271 that a shared window was deleted, then the sharing events process 260 deletes the window at step 272 and proceeds to step 273.

At step 273, it is next determined whether the sharing events process 260 is finished receiving shared events. If the sharing events process 260 is not finished sharing events, then the sharing events process 260 returns to repeat steps 261 through 273. If it is determined that the sharing events process 260 is finished receiving events at step 273, then the sharing events process 260 then exits at step 279.

Illustrated in FIG. 6E is a flow chart of an example of the dynamic window tree structure build process 280 for an unsynchronized window in the local sharedapp process 200, referenced in FIG. 6D.

With regard to FIG. 6E, the dynamic window tree structure build process 280 for an unsynchronized window first identifies, at step 281, all the top-level application windows for the application having the unsynchronized window. At step 282, the dynamic window tree structure build process 280 instructs the local X server 100 to create an input-only window for each top-level application window identified in step 281. At step 283, the dynamic window tree structure build process 280 instructs the local X server 100 to re-parent the input-only window on top of each top-level application window identified in step 281. This is done so that any user input directed toward this application will be intercepted and rejected by the input-only window.

At step 284, the dynamic window tree structure build process 280 attempts to synchronize the tree structure for the unsynchronized window in both the local sharedapp process 200 and in the remote sharedapp process 400. The dynamic synchronization of an unsynchronized window tree structure process 300 is herein defined in further detail with regard to FIG. 6F.

At step 285 in FIG. 6E, the dynamic window tree structure build process 280 containing the unsynchronized window sends an event to the local X server 100 to unmap (i.e., terminate) the input-only window on each top level application window. The dynamic window tree structure build process 280 for an unsynchronized window then exits at step 289.

Figure 6F:
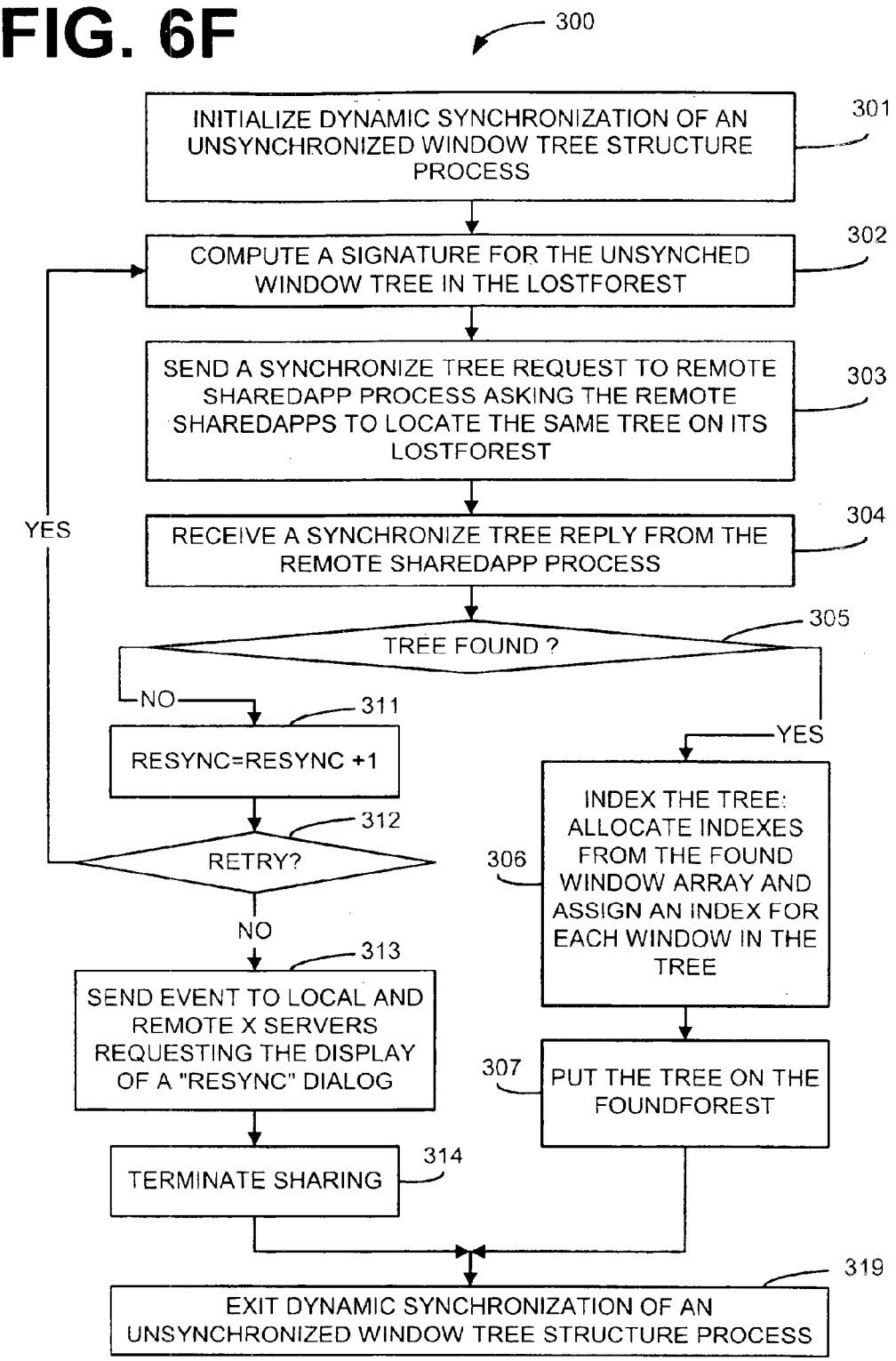
FIG. 6F is a flow chart of an example of the dynamic synchronization of an unsynchronized window tree structure process in the local sharedapp process in the example window correlation system, as shown in FIG. 6E.

Illustrated in FIG. 6F is a flow chart of an example of the dynamic synchronization of an unsynchronized window tree structure process 300 in the local sharedapp process 200, referenced in FIG. 6E. The dynamic synchronization of an unsynchronized window tree structure process 300 includes another portion of the synchronization verification system and method of the present invention.

First at step 301 in FIG. 6F, the dynamic synchronization of an unsynchronized window tree structure process 300 is initialized. The dynamic synchronization of an unsynchronized window tree structure process 300 computes a signature for the unsynchronized window tree in the lostforest at step 302. As stated above, the signature represents the "shape" of the window tree.

At step 303, the dynamic synchronization of an unsynchronized window tree structure process 300 sends a synchronized tree request to the remote sharedapp process 400 asking the remote sharedapp process 400 to locate the same tree on its lostforest. At step 304, the dynamic synchronization of an unsynchronized window tree structure process 300 receives a synchronized tree reply from the remote sharedapp process 400.

At step 305, the dynamic synchronization of an unsynchronized window tree structure process 300 determines if the unsynchronized window tree in the lostforest was found by the remote sharedapp process 400. If the remote sharedapp process 400 did not find the same tree in its lostforest, the dynamic synchronization of an unsynchronized window tree structure process 300 then increments the resynchronize counter by 1 at step 311. At step 312, the dynamic synchronization of an unsynchronized window tree structure process 300 determines if it is to retry the synchronization of the unsynchronized window tree. If the dynamic synchronization of an unsynchronized window tree structure process 300 is to retry the synchronization of an unsynchronized window, then the dynamic synchronization of an unsynchronized window tree structure process 300 returns to repeat steps 302 through 305.

If the dynamic synchronization of an unsynchronized window tree structure process 300 determines that a retry is not to be performed, then at step 313, then an event is sent to the local X server 100 and the remote X server 600 requesting the display of a resynchronize dialog. This provides another aspect of the synchronization verification system and method of the present invention, for the dynamic synchronization of an unsynchronized window tree structure. The local sharedapp process 200 next terminates the sharing of the current application at step 314 and exits the dynamic synchronization of an unsynchronized window tree structure process 300 at step 319.

If, at step 305, the remote sharedapp process 400 determines that the same tree is found on the remote sharedapp process 400 lostforest, then the dynamic synchronization of an unsynchronized window tree structure process 300 indexes the tree and allocates an index from the found window array. The dynamic synchronization of an unsynchronized window tree structure process 300 also assigns an index for each window in the tree at step 306. At step 307, the tree is then put on the foundforest and the dynamic synchronization of an unsynchronized window tree structure process 300 exits at step 319.

Illustrated in FIG. 6G is a flow chart of an example of the send device-input event process 320 in the local sharedapp process 200 of the present invention, referenced in FIG. 6D.

First with regard to FIG. 6G, the send device-input event process 320 is initialized at step 321. At step 322, the send device-input process 320 determines whether throttling of events is enabled. If the throttling of events is not enabled, the send device-input event process 320 skips to step 335 and sends the device-input event to the remote sharedapp process 400.

If, however, it is determined at step 322 that throttling of events is enabled, the send device-input event process 320 next determines, at step 323, whether this is the first time an event has been sent to the remote sharedapp process 400. If this is not the first event sent to the remote sharedapp process 400, the send device-input event 320 skips to step 325. If it is determined, at step 323, that this is the first event sent to the remote sharedapp process 400, the send device-input event 320 sets the throttling event count and sent event count to zero (0) at step 324.

At step 325, the send device-input event process 320 determines if a throttling event is to be sent. Throttling events are interspersed at user predetermined intervals throughout the input event stream. Throttling events are sent to the remote sharedapp process 400 just as real input events are sent. Throttling events can be sent by, for example but not limited to, interspersing a throttling event after a predetermined number of input device events are sent, or after a predetermined elapsed time period. Once the throttling events are received by the remote sharedapp process 400, throttling events are sent to the remote X server 600. The remote X server 600 then sends a reply to the throttling event back to the remote sharedapp process 400 that is then forwarded to the send device-input event process 320 in the local sharedapp process 200.

The send device-input event 320 receives the last throttling event process reply from the remote sharedapp process 400 at step 332. The send device-input event 320 calculates the number of throttling events backlogged and increments the throttling event count at step 333.

At step 334, the send device-input event 320 sends a message to the user indicating the status of the remote applications. In the preferred method, this message is in the form of a pacing meter indicator. The pacing meter is a user interface that will appear green for small delays. The pacing meter turns from shades of green to yellow or red, as the delay of processing the events in the remote X server increases. In an alternative method, the message to the user indicating the status of the remote applications could be a simple status message or other meter display to the user. The pacing meter can also be used to detect slow or inactive connections to a remote system. In this alternative method, if one of the remote systems suddenly stops responding, then the pacing meter would immediately go red, thereby warning the user of a possible network problem.

In an alternative method for calculating the event delay, the send device-input event 320 could utilize an event elapsed time period, instead of the change in the number of outstanding throttling events, to determine the event backlog. In the alternative method, a throttling event is sent from the send device-input event 320 to the remote sharedapp process 400 for forwarding on to the remote X server 600. The remote X server 600 replies to the remote sharedapp process 400 and that reply is sent back to the send device-input event 320. The send device-input event 320 is then able to calculate the magnitude of the delay in the processing of events by the remote X server process 600. Calculating the time delta between the time the throttling event was sent and the time that the reply to the throttling event was received calculates the magnitude of the delay.

At step 335, the send device-input event 320 sends the device-input event to a buffer that is forwarded to the remote sharedapp process 400. The buffer send device-input event process 340 is herein defined in further detail with regard to FIG. 6H. The send device-input event 320 exits at step 339.

Figure 6H:
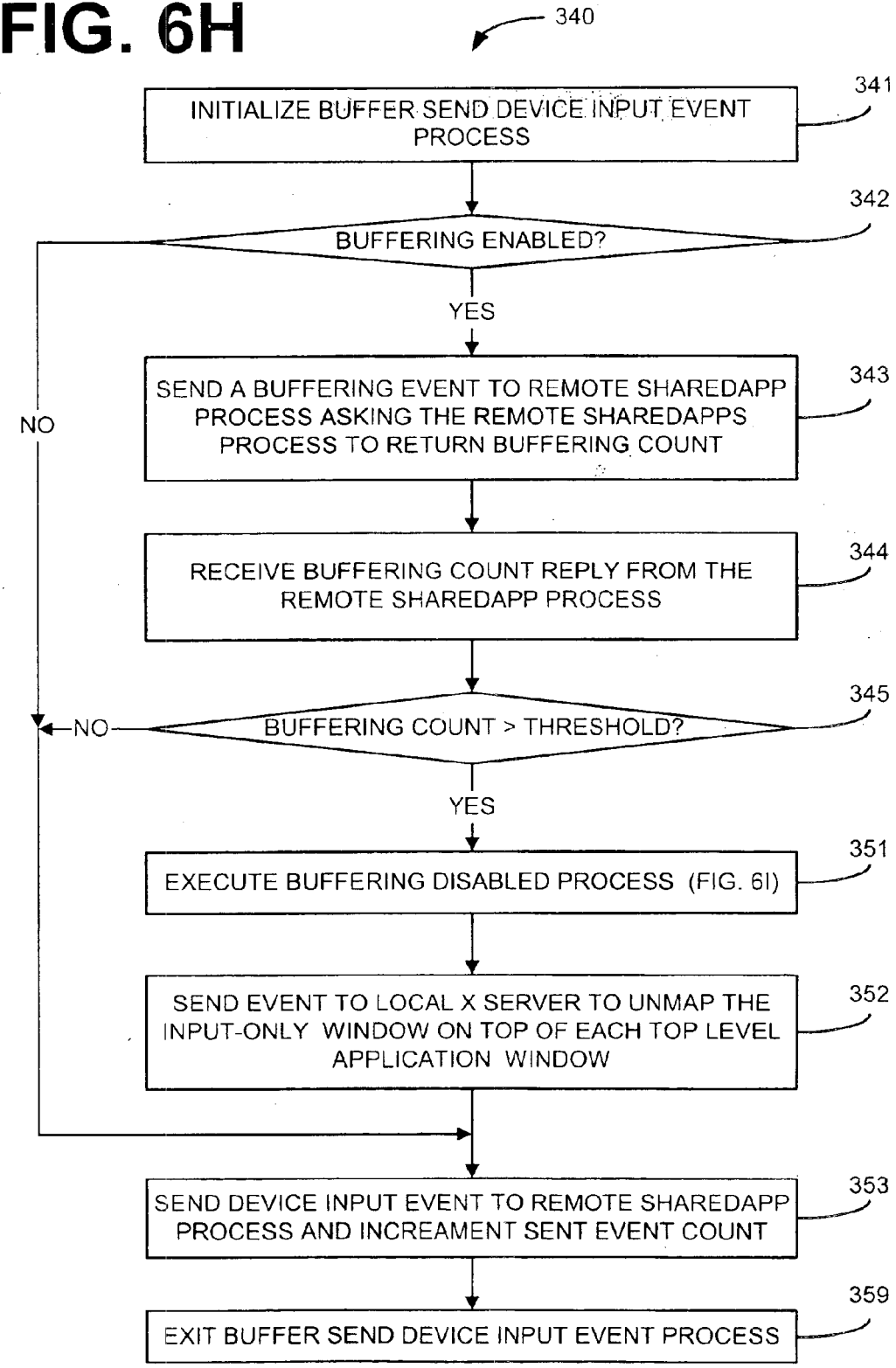
FIG. 6H is a flow chart of an example of the buffer send device-input event process in the local sharedapp process in the example window correlation system, as shown in FIG. 6G.

Illustrated in FIG. 6H is a flow chart of an example of the buffer send device-input event process 340 in the local sharedapp process 200 of the present invention, referenced in FIG. 6G.

First, referring to FIG. 6H, the buffer send device-input event process 340 is initialized at step 341. At step 342, the buffer send device-input event process 340 determines whether buffering of events is enabled. If the buffering of events is not enabled, then the buffer send device-input event process 340 skips to step 353. If the buffering of events is enabled, then the buffer send device-input event process 340 sends a buffering event to the remote sharedapp process 400. The buffering event sent queries the remote sharedapp process 400 to return a buffering count. The buffer send device-input event process 340 waits for a buffering count reply from the remote sharedapp process 400. Upon receiving the buffering count reply the buffer send device-input event process 340 determines if the buffering count is greater than the threshold. The threshold is either a default system or a user predefined count.

If it is determined at step 345 that the buffering count is less than or equal to the threshold, the buffer send device-input event process 340 skips to step 353 to send the device input event to the remote sharedapp process 400. If it is determined at step 345, that the buffering count is greater than the threshold, the buffer send device-input event process 340 suspends further input from the user. Further input from the user is suspended by disabling the buffering process in the local sharedapp process 200 and waiting for buffering enablement by the remote sharedapp process 400. The buffering disable process 360 is herein defined in further detail with regard to FIG. 6I.

Still referring to FIG. 6H, upon receiving a buffering enablement reply from the remote sharedapp process 400, the buffer send device-input event process 340 sends an device-input event to the local X server 100 at step 352. The device-input event instructs the local X server 100 to unmap the input-only window over each top-level application window created and re-parented in the buffering disable process 360.

At step 353, the buffer send device-input event process 340 sends the device-input event to the remote sharedapp process 400 and increments the sent event count. The buffer send device-input event process 340 then exits at step 359.

Figure 6I:
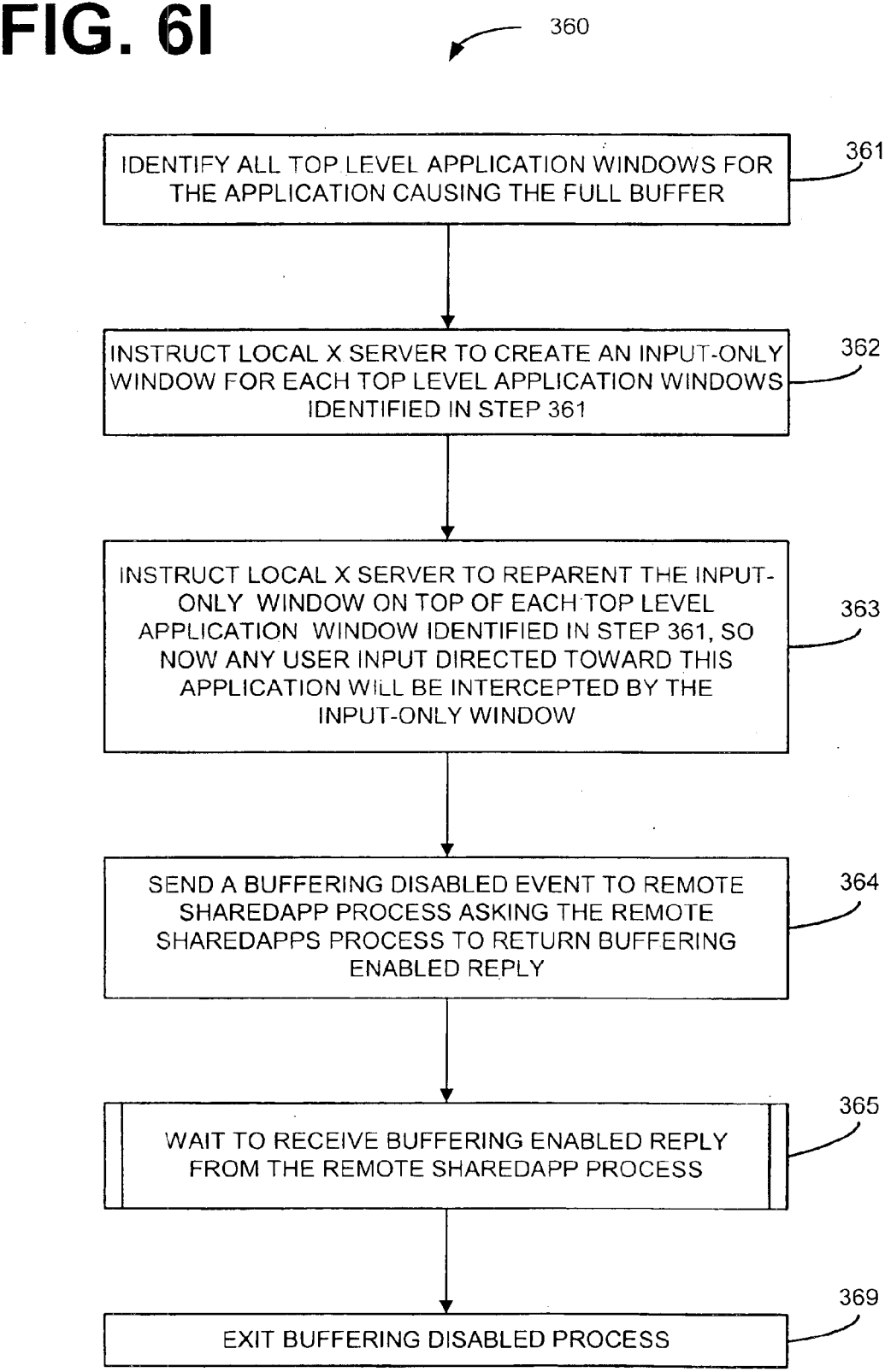
FIG. 6I is a flow chart of an example of the buffering disable process in the local sharedapp process in the example window correlation system, as shown in FIG. 6H.

Illustrated in FIG. 6I is a flow chart of an example of the buffering disable process 360 in the local sharedapp process 200 in the window correlation system 60, referenced in FIG. 6H.

First, at step 361 in FIG. 61, the buffering disable process 360 identifies all the top-level application windows in the application(s) causing a full buffer condition. At step 362, the buffering disable process 360 instructs the local X server 100 to create an input-only window for each top-level application window identified at step 361.

Next, at step 362, the buffering disable process 360 instructs the local X server 100 to re-parent (i.e., place) the input-only window on top of each top-level application window identified at step 361. In the manner, any user input directed towards this shared application will be intercepted by the input-only window. At step 364, the buffering disable process 360 sends a buffering disabled event to remote sharedapp process 400 asking the remote sharedapp process 400 to return a buffering enablement reply.

Next at step 365, the buffering disable process 360 waits to receive a buffering enablement reply from the remote sharedapp process 400. This delay is utilized to prevent the applications causing the full buffer in the remote sharedapp process 400 to continue to generate events, and provides the remote sharedapp process 400 time to process the full buffer. After receiving a buffering enabled reply from the remote sharedapp process 400 at step 365, the buffering disable process 360 exits at step 369.

Illustrated in FIG. 7A is a flow chart of an example of the remote sharedapp process 400 in the window correlation system 60, as shown in FIGS. 1, 2A, 3 and 4.

First, referring to FIG. 7A, the remote sharedapp process 400 is initialized as step 401. At step 402, the remote sharedapp process 400 receives a request from the local sharedapp process 200 to locate a remote application to be shared. This request from the local sharedapp 200 is performed at step 243 (FIG. 6C). At step 403, the remote sharedapp process 400 requests the current state of the window tree from the remote X server 600. The remote sharedapp process 400 receives the current state of the window tree from the remote X server 600 at step 404.

At step 405, the remote sharedapp process 400 determines if there is more than one shared application located. If there is not more than one shared application, the remote sharedapp process 400 proceeds to step 412. If it is determined at step 405 that there is more than one shared application located, then the remote sharedapp process 400 requests that the remote user indicate which remote client application is to be shared at step 411. This request for selection of the proper, remote client application to be shared can be accomplished a number of different ways including, for example but not limited to, sending a message event to the remote X server 600 for display to the remote user.

At step 412, the remote sharedapp process 400 builds the remote window tree structure with the remote X server process 600 and proceeds to synchronize the tree structures in the remote sharedapp process 400 and the local sharedapp process 200. The building and synchronization of the window tree structures processes are herein defined in further detail with regard to FIGS. 7B and 7C, respectively.

In step 413 in FIG. 7A, the remote sharedapp process starts sharing events with the local sharedapp process 200. The sharing events process is herein defined in further detail with regard to FIG. 7D.

At step 414 in FIG. 7A, the remote sharedapp process 400 determines if the shared application is to be continued. If application sharing is to be continued, the remote sharedapp process 400 returns to repeat steps 413 through 414. If it is determined that the remote sharedapp process 400 is not to continue sharing the current application, the remote sharedapp process 400 returns to repeat steps 402 through 414.

Illustrated in FIG. 78 is a flow chart of an example of the build remote window tree structure process 420 in the remote sharedapp process 400 referenced in FIG. 7A.

Figure 7B:
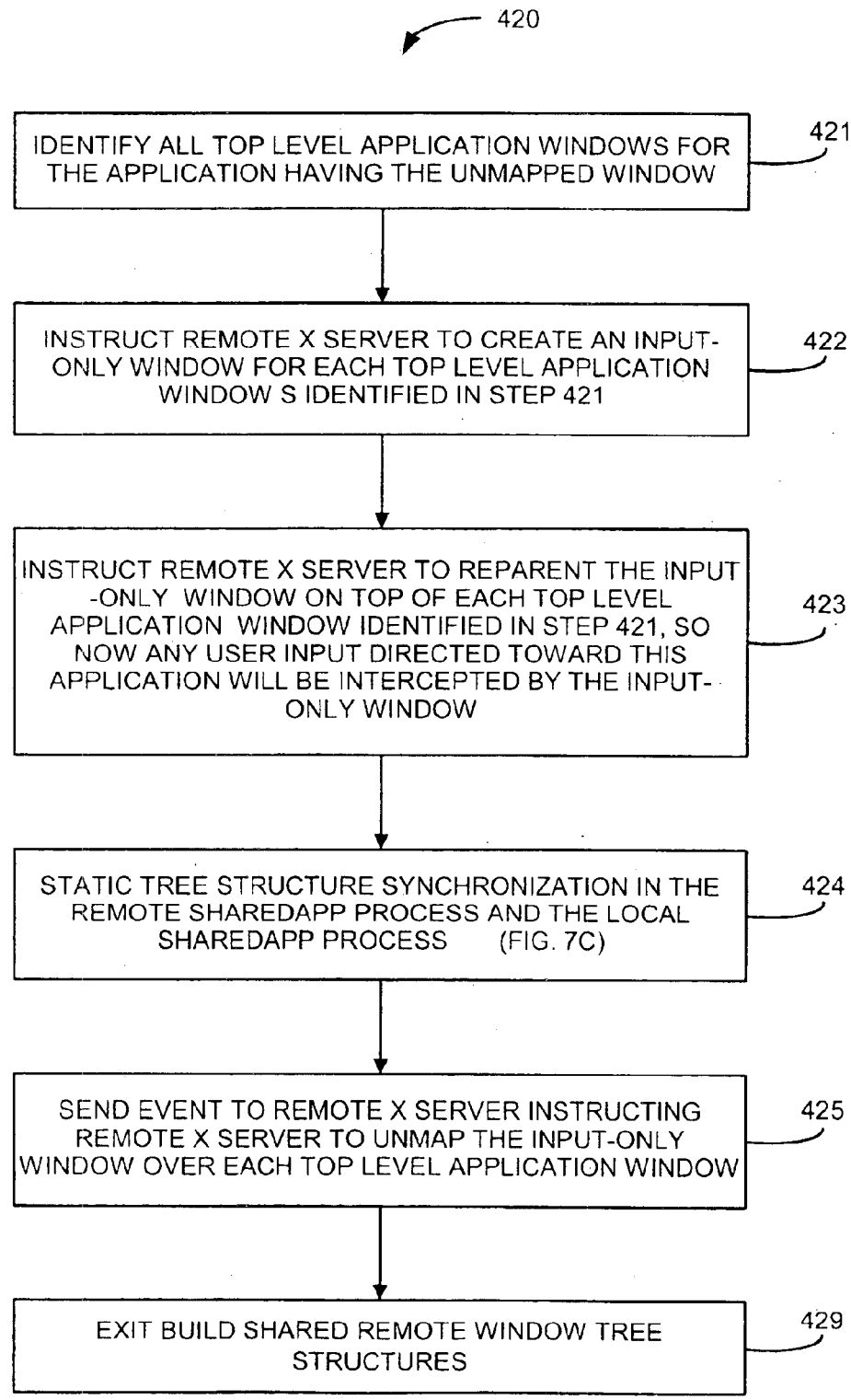
FIG. 7B is a flow chart of an example of the window tree structure build process in the remote sharedapp process in the example window correlation system, as shown in FIG. 7A.

First, as shown in FIG. 7B, the build remote window tree structure process 420 disables the remote user input. At step 421, the build remote window tree structure process 420 identifies all the top level application windows for the application having the unmapped window. At step 422, the remote X server 600 is instructed to create an input-only window for each of the top level application windows identified in step 421. At step 423, the remote X server 600 is instructed to re-parent the input-only window on top of each top level application window identified in step 421, so that any user input directed to this application will be intercepted by the input-only window.

The build remote window tree structure process 420 then synchronizes the tree structures in the remote sharedapp process 400 and the local sharedapp process 200 at step 424. The synchronization of the tree structures in the remote sharedapp process 400 with the local sharedapp process 200 is herein defined in further detail with regard to FIG. 7C.

At step 425, the build remote window tree structure process 420 sends an event to remote X server 600 instructing the remote X server 600 to unmap (i.e., terminate) the input-only window over each top level application window established by the disabled remote user input process performed in steps 421–423. The build shared remote window tree structure process 420 then exits at step 429.

Figure 7C:
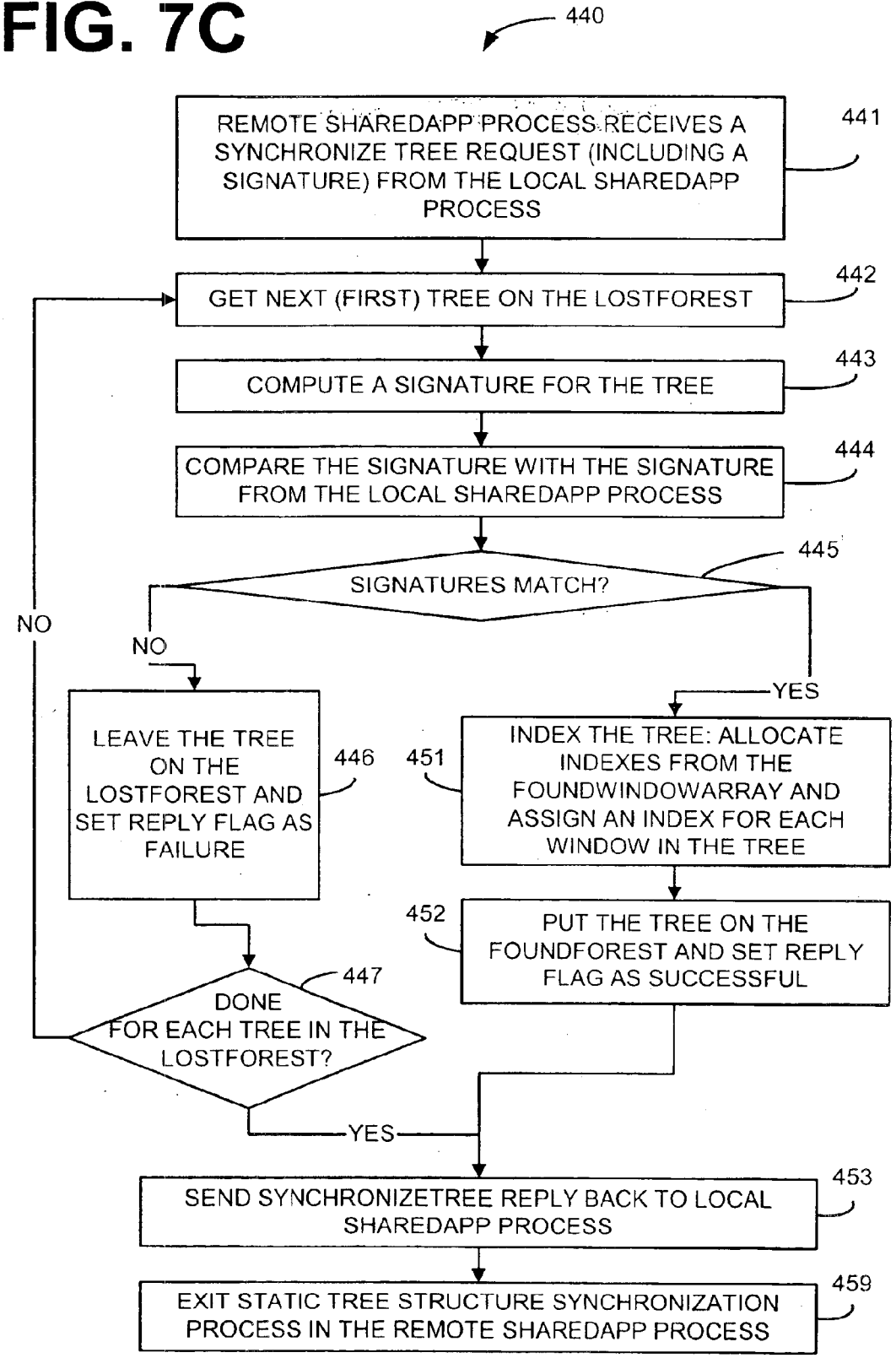
FIG. 7C is a flow chart of an example of the window tree structure static synchronization process in the remote sharedapp process in the example window correlation system, as shown in FIG. 7B.

Illustrated in FIG. 7C is a flow chart of an example of the static tree structure synchronization process 440 in the remote sharedapp process 400, referenced in FIG. 7B.

With regard to FIG. 7C, the static tree structure synchronization process 440, in the remote sharedapp process 400, receives a synchronized tree request at step 441. At step 442, the static tree structure synchronization process 440 gets the first or next tree on the lostforest. At step 443, the signature is computed for the tree obtained at step 442. At step 444, the signature computed at step 443 is compared with the signature received from the local sharedapp process 200 at step 441.

If, at step 445, the signature computed at step 443 does not match the signature received from the local sharedapp process 200 at step 441, then the static tree structure synchronization process 440 proceeds to step 446 and leaves the tree for which the signature was computed on the lostforest. The static tree structure synchronization process 440, at step 446, sets a reply flag indicating a failure has occurred. At step 447, the static tree structure synchronization process 440 determines whether an attempt has been made to match each tree in the lostforest for the remote shared process 400. If there are more trees on the lostforest, then the static tree structure synchronization process 440 returns to 442 to get the next tree from the lostforest.

When it is determined at step 447 that each tree on the lostforest has been compared with the tree signature received from the local sharedapp process 200, then the static tree structure synchronization process 440 sends a synchronized tree reply back to the local sharedapp process 200 at step 453. The static tree structure synchronization process 440 then exits at step 459.

However, if it is determined at step 445 that the signature received from the local sharedapp process 200 matches the signature computed at step 443, then the static tree structure synchronization process 440 indexes the tree at step 451. The static tree structure synchronization process 440 also allocates the indexes for the found window array and assigns an index for each window in the tree at step 451. At step 452, the current tree is placed on the foundforest and a reply flag indicating success is set at step 452. The static tree structure synchronization process 440 sends the synchronized tree reply back to the local sharedapp process 200 at step 453 and exits at step 459.

Illustrated in FIG. 7D is a flow chart of an example of the share events process 460 in the remote sharedapp process 400 in the window correlation system 60 referenced in FIG. 7A.

At step 461 in FIG. 7D, the sharing events process 460 and the remote sharedapp process 400 receives a shared event from the local sharedapp process 200, or an event from the remote X server 600. At step 462, the sharing events process 460 determines if the shared event is from the local sharedapp process 200. If the event is from the local sharedapp process 200, the shared events process 460 processes the event received from the local sharedapp process 200 at step 463. The processing of the shared events from the local sharedapp process 200 is hereindefined in further detail with regard to FIG. 7E. After processing the shared events from the local sharedapp process 200 at step 463, the remote sharedapp process 400 skips to step 466 to determine whether the sharing events process 460 is finished receiving events.

If it is determined at step 462 that the event received is not a shared event from a local sharedapp process 200, the sharing events process 460 proceeds to step 464 to determine if the event received was from the remote X server 600. If the event was not from the remote X server 600, then the sharing events process 460 proceeds to step 466 to determine if the sharing events process 460 is finished receiving events.

When the event received at step 461 is from a remote X server 600, the sharing events process 460 processes the event received from the remote X server 600 at step 465. The processing of events from the remote X server 600 is herein defined in further detail with regard to FIG. 7F. After processing the event from the remote X server 600, the sharing events process 460 proceeds to step 466 to determine if the sharing events process 460 is finished receiving events.

If it is determined at step 466 that the sharing events process 460 is not finished receiving events, the sharing events process 460 returns to repeat steps 461 through 466. If it is determined at step 466 that the sharing events process 460 is finished receiving events, the sharing events process 460 exits at step 469.

Illustrated in FIG. 7E is a flow chart of an example of the processing of local sharedapp events process 480 in the remote sharedapp process 400 in the window correlation system 60, referenced in FIG. 7D.

At step 481 in FIG. 7E, the processing of local sharedapp events process 480, in the remote sharedapp process 400, receives the shared events from the local sharedapp process 200. At step 482 processing of local sharedapp events process 480 determines if the event received from the local sharedapp process 200 is a device-input event. If it is determined that the event received is not a device-input event, then the processing of local sharedapp events process 480 skips to step 485 herein defined below.

If it is determined at step 482 that the event received from the local sharedapp process 200 is a device-input event, then the processing of local sharedapp events process 480 next determines at step 483 if the device-input event is with regard to a window that is synchronized. If it is determined at step 483 that the device-input event received from the local sharedapp process 200 at step 481 is not associated with a synchronized window, then the processing of local sharedapp events process 480 returns to step 481 to receive the next shared event from the local sharedapp process 200.

When it is determined at step 483, that the device-input event received at step 481 is a device-input event associated with a synchronized window, the processing of local sharedapp events process 480 injects the event into the remote X server 600 at step 484. The processing of local sharedapp events process 480 then returns to step 481 to receive the next shared event from the local sharedapp process 200.

At step 485, the processing of local sharedapp events process 480 determines if the event received from the local sharedapp process 200 is a synchronized tree request. If the event received from the local sharedapp process 200 is not a synchronized tree request, then the local sharedapp events process 480 proceeds to step 491 to determine if a buffering event request was received.

When it is determined at step 485 that the event received at step 481 is a synchronized tree request, the processing of local sharedapp events process 480 synchronizes the tree structure for the synchronized window in the remote sharedapp process 400 and the local sharedapp process 200. This synchronization tree request is herein defined in further detail with regard to FIG. 7G. Still referring to FIG. 7E, after performing the synchronization of the tree structure for the synchronized window in the remote sharedapp process 400 and the local sharedapp process 200, the processing of local sharedapp events process 480 returns to step 481 to receive the next shared event from the local sharedapp process 200.

In step 491 of FIG. 7E, the processing of local sharedapp events process 480 determines if a buffering event request was received. If it is determined in step 491 that the event received at step 481 is not buffering event request, then the processing of local sharedapp events process 480 proceeds to step 493 to determine if the event received at step 481 is another sharedapp request.

If it is determined at step 491, that the event received at step 481 was a buffering event request, the processing of local sharedapp events process 480 processes the buffering event request at step 492. This buffering event request is herein defined in further detail with regard to FIG. 7J. After performing the buffering event request, the processing of local sharedapp events process 480 returns to step 481 of FIG. 7E to receive the next shared event from the local sharedapp process 200.

At step 493, the processing of local sharedapp events process 480 determines if there is another sharedapp request. If it is determined in step 493 that the event received at step 481 is not another sharedapp request, the processing of local sharedapp events process 480 proceeds to step 495 to determine if the processing of local sharedapp events process 480 is finished receiving events.

If it is determined at step 493 that the event received at step 481 was another sharedapp request, the processing of local sharedapp events process 480 processes the sharedapp request at step 494. The processing of local sharedapp events process 480 then returns to step 481, to receive the next shared event from the local sharedapp process 200.

At step 495, the processing of local sharedapp events process 480 determines if it is finished receiving events. If it is determined that there are more events to be received from the local sharedapp process 200, then the processing of local sharedapp events process 480 returns to repeat steps 481 through 495. If, however, it is determined that processing of local sharedapp events process 480 is finished, then the processing of local sharedapp events process 480 exits at step 499.

Illustrated in FIG. 7F is a flow chart of an example of the process of events from remote X server process 500, in the remote sharedapp process 400, referenced in FIG. 7D.

Referring to FIG. 7F, the process of events from remote X server process 500 receives the shared event from the remote X server 600 at step 501. At step 502, the process of events from remote X server process 500 determines if the event received from the remote X server 600 is a create window notification event. If it is determined at step 502 that the event received from the remote X server 600 is not a create window notification event, the process of events from remote X server process 500 skips to step 504.

When it is determined at step 502 that the event received from the remote X server 600 is a create window notification event, the process of events from remote X server process 500 adds a tree to the proper forest and disables remote user-input. The step of adding a tree to the proper forest and disabling the remote user-input process is herein defined with regard to FIG. 7H. After adding the tree to the proper forest and disabling the remote user-input at step 503, the process of events from remote X server process 500 returns to receive the next event from the remote X server 600.

At step 504 of FIG. 7F, the process of events from remote X server process 500 determines if the event received from the remote X server 600 is a destroy window notification event. If it is determined at step 504 that the event received from the remote X server 600 is not a destroy window notification event, the process of events from remote X server process 500 skips to step 511.

If the process of events from remote X server process 500 determines, at step 504, that the event received from the remote X server 600 is a destroy window notification event, the tree signature for the appropriate application is marked as invalid. The process of events from remote X server process 500 also deletes the window, and removes the destroyed window tree from the current tree. If the destroyed tree is the top of a tree, the process of events from remote X server process 500 also removes the tree from the forest at step 505. After completing the processing at step 505, the process of events from remote X server process 500 returns to step 501 to receive the next shared event from the remote X server 600.

At step 511, the process of events from remote X server process 500 determines if the event received from the remote X server 600 is a button release event on an input-only window event. If it is determined at step 511 that the event received from the remote X server 600 is not a button release event on an input-only window, the process of events from remote X server process 500 skips to step 513.

If the process of events from remote X server process 500 determines at step 511 that the event received at step 501 is a button release event on an input-only window, the process of events from remote X server process 500 requests leadership for the remote user at step 512. Leadership is the ability to input commands and data into the shared application. The process of events from remote X server process 500 also enables, at step 512, the remote user input that was disabled at step 503. The process of events from remote X server process 500 enables the remote user-input by sending an event to the remote X server 600 instructing the remote X server 600 to unmap the input-only window over the top level window at step 512. After requesting leadership and enabling the remote user input, the process of events from remote X server process 500 returns to step 501 to receive the next shared event from the remote X server 600.

After requesting leadership, the local X server 100, the local sharedapp process 200, the remote X server 600 and the remote sharedapp process 400 exchange functionality. By doing so, the remote X server 600 and remote sharedapp process 400 become the new local X server 100 and local sharedapp process 200 respectively. In this switch, the remote X server 600 and remote sharedapp process 400 are enabled for the functionality of the local X server 100 and local sharedapp process 200 respectively. The current local sharedapp process 200 and local X server 100 also switch functionality to that of the remote X server 600 and remote sharedapp process 400 respectively. Performing this switch process allows the remote X server 600 to accept input from the remote user for display on the local X server 100 to the local user.

At step 513, the process of events from remote X server process 500 determines if the event received from the remote X server 600 is another event. If it is determined at step 513 that the event received from the remote X server 600 is not another event, then the process of events from remote X server process 500 skips to step 515.

If the process of events from remote X server process 500 determines at step 513, that the event received from the remote X server 600 is another event, then the process of events from remote X server process 500 processes the event at step 514. After completing the processing at step 514, the process of events from remote X server process 500 returns to step 501 to receive the next shared event from the remote X server 600.

At step 515 the process of events from remote X server process 500 determines if it is finished receiving events. If the process of events from remote X server process 500 is not done receiving events, then the process of events from remote X server process 500 returns to repeat steps 501 through 515. If the process of events from remote X server process 500 is done receiving events, then it exits at step 519.

Figure 7G:
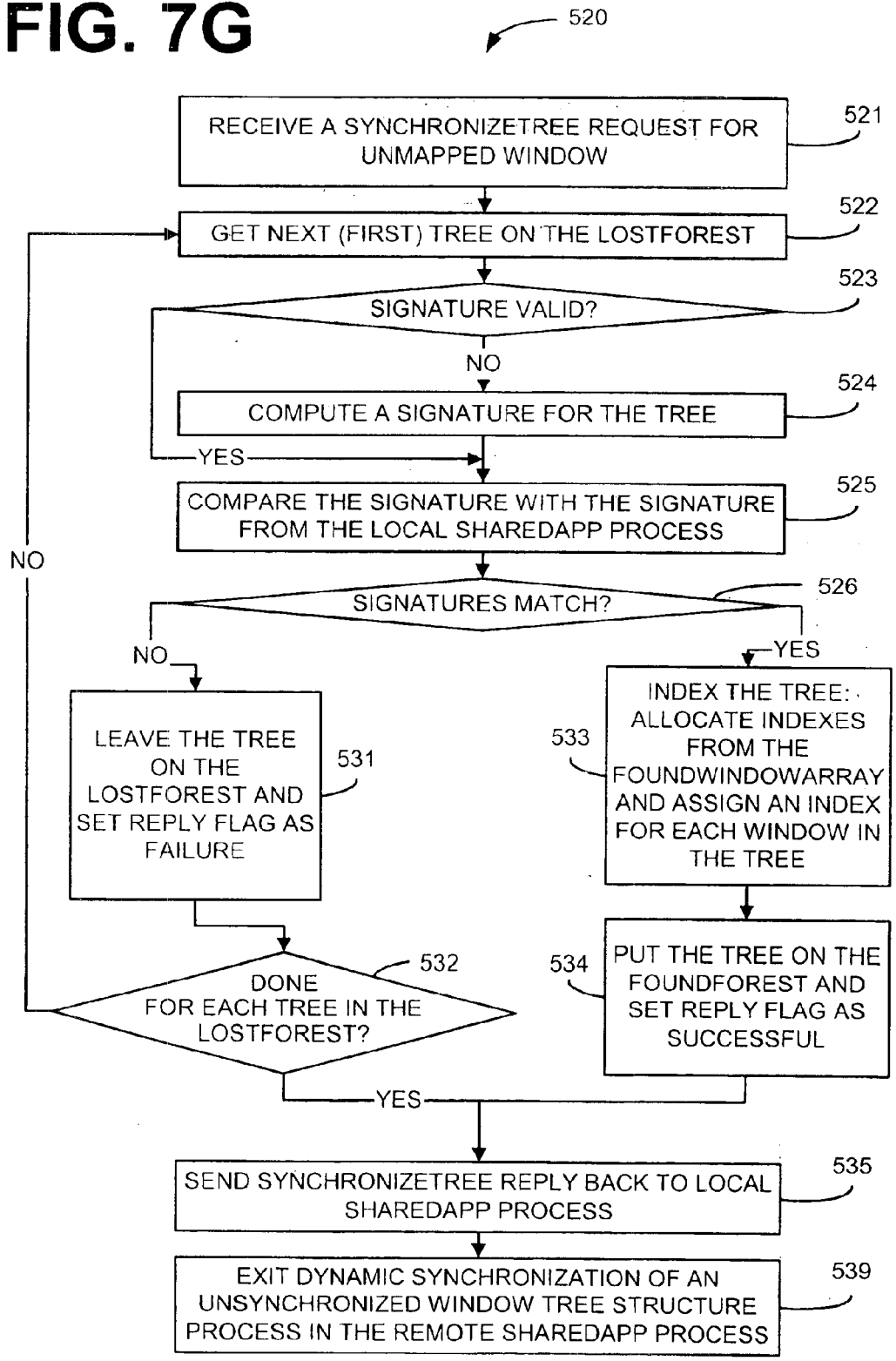
FIG. 7G is a flow chart of an example of the window tree structure dynamic synchronization process in the remote sharedapp process in the example window correlation system, as shown in FIG. 7E.

Illustrated in FIG. 7G is a flow chart of an example of the dynamic synchronization of an unsynchronized window tree structure process 520, in the remote sharedapp process 400, referenced in FIG. 7E. The dynamic synchronization of an unsynchronized window tree structure process 520, in the remote sharedapp process 400, communicates with the dynamic synchronization of an unsynchronized window tree structure process 300, in the local sharedapp process 200, to provide dynamic synchronization of an unsynchronized window tree structures.

First, referring to FIG. 7G, the dynamic synchronization of an unsynchronized window tree structure process 520 receives a synchronized tree request for an unmapped window at step 521. At step 522, the dynamic synchronization of an unsynchronized window tree structure process 520 gets the first (or next tree during loop processing) on the lostforest.

At step 523, the dynamic synchronization of an unsynchronized window tree structure process 520 determines if the signature for the current tree (from the lostforest) is valid. If the signature for the current tree is valid, the dynamic synchronization of an unsynchronized window tree structure process 520 skips to step 525. If the signature for the current tree is not valid, the dynamic synchronization of an unsynchronized window tree structure process 520 computes the signature at step 22 for the current tree.

At step 525, the signature for the current tree is compared with the signature received at step 521 from the local sharedapp process 200. At step 526 the dynamic synchronization of an unsynchronized window tree structure process 520 determines if the signature received at step 521 matches the signature for the current tree.

When the signatures do not match, the dynamic synchronization of an unsynchronized window tree structure process 520 leaves the signature for the current tree on the lostforest at step 531. The dynamic synchronization of an unsynchronized window tree structure process 520 also sets, at step 531, a reply flag to indicate a failure. At step 532, the dynamic synchronization of an unsynchronized window tree structure process 520 determines if synchronization of each tree in the lostforest for the remote sharedapp process 400 has been attempted. If there are more trees on the lostforest, the dynamic synchronization of an unsynchronized window tree structure process 520 returns to step 522 to get the next tree from the lostforest. If it is determined at step 532 that the signature for each tree on the lostforest has been compared with the tree signature received from the local sharedapp process 200, the dynamic synchronization of an unsynchronized window tree structure process 520 sends a synchronized tree failure reply back to the local sharedapp process 200 at step 535. The dynamic synchronization of an unsynchronized window tree structure process 520 then exits at step 539.

If, at step 526, it is determined that the signature received from the local sharedapp process 200 matches the signature for the current tree on the lostforest, the dynamic synchronization of an unsynchronized window tree structure process 520 indexes the tree at step 533. The dynamic synchronization of an unsynchronized window tree structure process 520 also allocates the indexes for the found window array and assigns an index for each window in the tree at step 533.

At step 534, the current tree is placed on the foundforest and a reply flag indicating success is set at step 534. The dynamic synchronization of an unsynchronized window tree structure process 520 sends the synchronized tree successful reply back to the local sharedapp process 200 at step 535 and exits at step 539.

Figure 7H:
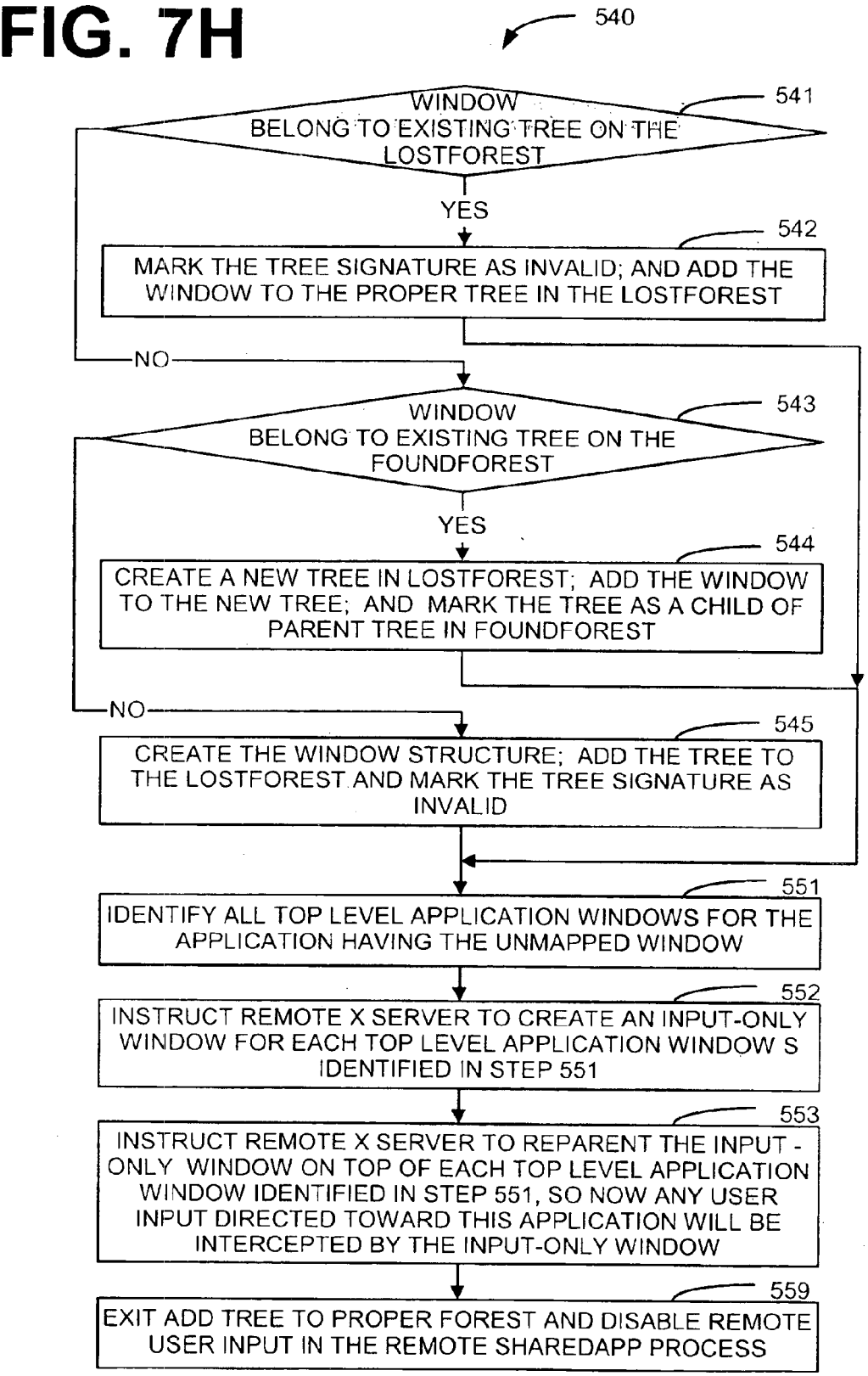
FIG. 7H is a flow chart of an example of the add tree to proper forest and disable remote user input process in the remote sharedapp process in the example window correlation system, as shown in FIG. 7H.

Illustrated in FIG. 7H is a flow chart of an example of the add tree to proper forest and disable remote user input process 540, in the remote sharedapp process 400, referenced in FIG. 7F.

At step 541 of FIG. 7H, the add tree to proper forest and disable remote user input process 540 determines if the window created, from the event received at step 501 (FIG. 7F), belongs to an existing tree on the lostforest. If the window does belong to an existing tree on the lostforest, the tree signature for the window is marked as invalid and the window is added to the proper tree in the lostforest at step 542. After marking the tree signature as invalid and adding the window to the proper tree in the lostforest, the add tree to proper forest and disable remote user input process 540 then skips to step 551 to disable remote user input.

If it is determined at step 541 that the window does not belong to an existing tree on the lostforest, then the add tree to proper forest and disable remote user input process 540 then determines, at step 543, if the window belongs to an existing tree on the foundforest. If the window does belong to an existing tree on the foundforest, the add tree to proper forest and disable remote user input process 540 creates a new tree. The add tree to proper forest and disable remote user input process 540 adds the window to the new tree, and marks the newly created tree as a child of the parent tree located in the foundforest at step 544. The add tree to proper forest and disable remote user input process 540 then skips to step 551 to disable remote user input.

If it is determined at step 543 that the window does not belong to an existing tree on the found forest, the add tree to proper forest and disable remote user input process 540 proceeds to step 545. At step 545, the add tree to proper forest and disable remote user input process 540 creates a new tree. The add tree to proper forest and disable remote user input process 540 then creates a window structure and adds the window to the newly created tree. The add tree to proper forest and disable remote user input process 540 also adds the new tree to the lostforest and marks the tree signature as invalid.

At step 551 the add tree to proper forest and disable remote user input process 540 identifies all the top level application windows for the application having the unmapped window. At step 552, the remote X server 600 is instructed to create an input-only window for each of the top level application windows identified in step 551. At step 553, the remote X server 600 is instructed to re-parent the input-only window on top of each top level application window identified in step 551 so now any user input directed toward this application will be intercepted by the input-only window. The add tree to proper forest and disable remote user input process 540 then exits at step 559.

Illustrated in FIG. 7I is a flow chart of an example of the inject event to remote X server process 560 in the remote sharedapp process 400 in the window correlation system 60, referenced in FIG. 7E.

First, with regard to FIG. 7I, the inject event to remote X server process 560 is initialized as step 561. At step 562, the inject event to remote X server process 560 determines whether buffering of events is enabled. If buffering of events is not enabled, the inject event to remote X server process 56.0 skips to step 564 and injects the device-input event to the remote X server 600.

If, however, it is determined at step 562 that buffering of events is enabled, then the inject event to remote X server process 560 adds the event to the remote sharedapp buffer at step 563. The inject event to remote X server process 560 and skips to step 569 and exits.

At step 564, the inject event to remote X server process 560 injects the device-input event to the remote X server 600. The inject event to remote X server process 560 and skips to step 569 and exits.

Figure 7J:
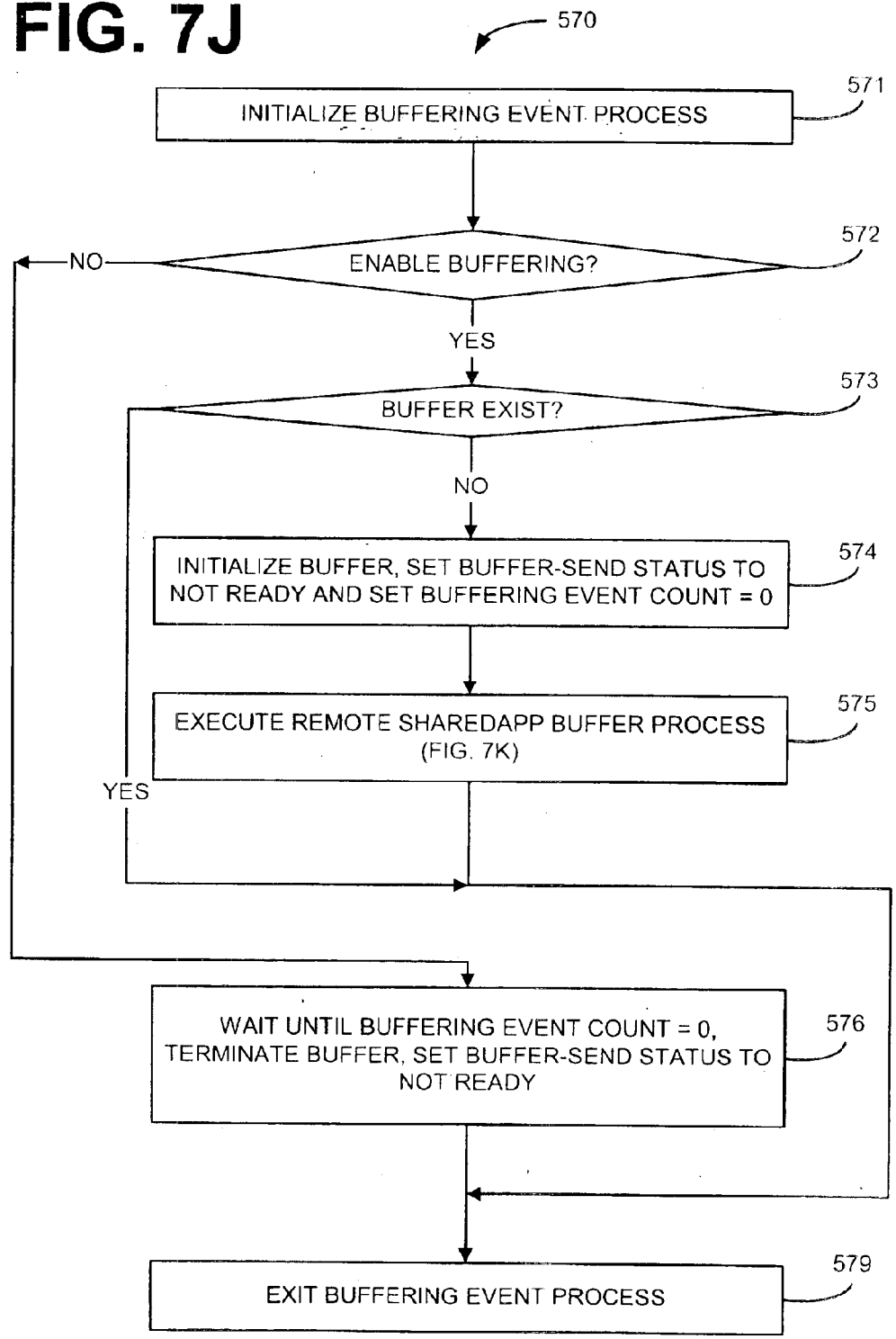
FIG. 7J is a flow chart of an example of the buffering event process in the remote sharedapp process in the example window correlation system, as shown in FIG. 7E.

Illustrated in FIG. 7J is a flow chart of an example of the buffering event process 570 in the remote sharedapp process 400, referenced in FIG. 7E.

First referring to FIG. 7J, the buffering event process 570 is initialized as step 571. At step 572, the buffering event process 570 determines whether buffering of events is currently enabled. If the buffering of events is not enabled, then the buffering event process 570 skips to step 579 and exits. If it is determined at step 572 that buffering is enabled, the buffering event process 570 then determines if a buffer exist at step 573. If it is determined that a buffer currently exists, the buffering event process 570 skips to step 579 and exits.

If it is determined that a buffer does not currently exist, the buffering event process 570 initializes a new buffer at step 574. Also, at step 574, the buffering event process 570 sets the buffer-send status to a not ready condition and sets the buffering event count to zero.

At step 575 the buffering event process 570 then performs the remote sharedapp buffer process. The remote sharedapp buffer process is herein defined with regard to FIG. 7K. The buffering event process 570 then skips to step 579 of FIG. 7J and exits.

Illustrated in FIG. 7K is a flow chart of an example of the remote sharedapp buffer process 580 in the remote sharedapp process 400, referenced in FIG. 7J.

First, with regard to FIG. 7K, the remote sharedapp buffer process 580 is initialized as step 581. At step 582, the remote sharedapp buffer process 580 checks if there are currently events in the buffer to send. If there are no events in the buffer to send, then after a predetermined amount of time, the remote sharedapp buffer process 580 repeats the check to determine if there are events in the buffer. If it is determined that there are events in the buffer, then the remote sharedapp buffer process 580 sends a buffering event to the remote X server 600 asking when the remote X server 600 is ready to receive events at step 583.

At step 584, the remote sharedapp buffer process 580 waits to receive a buffering event reply from the remote X server 600. When a buffering event reply is received from the remote X server 600, the remote sharedapp buffer process 580 injects an event in the buffer to the remote X server 600 at step 585.

After injecting an event to the remote X server 600, the remote sharedapp buffer process 580 then determines if it is done sending events to the remote X server 600 at step 586. If the remote sharedapp buffer process 580 is not done sending events, the remote sharedapp buffer process 580 returns to repeat steps 582 through 586. If it is determined that the remote sharedapp buffer process 580 is done sending events, the remote sharedapp buffer process 580 exits at step 589.

Figure 8B:
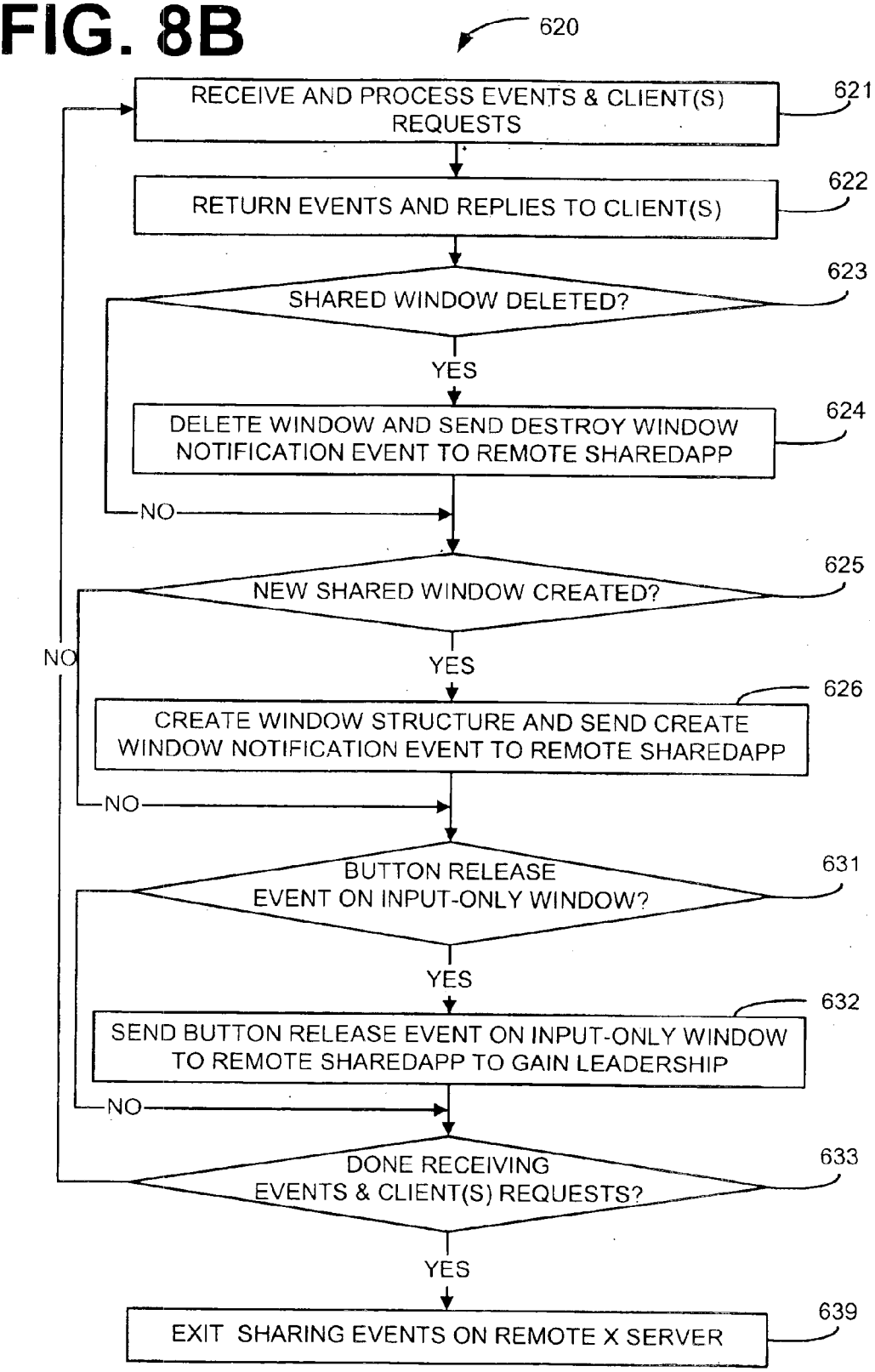

FIGS. 8A and 8B are flow charts collectively illustrating an example of the remote X server in the window correlation system 60, as shown in FIGS. 1, 2B, 3 and 4.

With regard to FIG. 8A, the remote X server 600 is initialized at step 601. The remote client 53X then connects to the remote X server 600 at step 602. At step 603, the remote X server 600 receives and processes events and client requests. At step 604, the remote X server 600 returns events and replies to the remote clients 53X. At step 605, the remote X server 600 determines whether an event was received indicating whether application sharing has begun. If input received at step 603 does not indicate the start of application sharing, then the remote X server 600 returns to repeat steps 603–605.

If input was received at step 603 indicating the start of application sharing, the remote X server 600 locates the remote application to be shared at step 606. At step 611, the remote X server 600 determines whether more than one remote shared application was located. If there was not more than one remote shared application located at step 611, the remote X server 600 proceeds to step 613 to process a request from the remote sharedapp process 400 for the window tree structures for the applications to be shared.

If, however, it is determined at step 611 that more than one shared applications are located, the remote X server 600 requests, at step 612, that the remote user indicate which remote application is to be shared.

At step 613, the remote X server 600 processes the request from the remote sharedapp process 400 for the window tree structures for the remote applications to be shared. At step 614, the remote X server 600 returns the remote window tree structures for the remote application to be shared to the remote shared application process 400. At step 615, the remote X server 600 maintains the shared remote window tree structures with the remote shared application while processing shared events. This maintaining of shared remote window tree structures is herein defined in further detail with regard to FIG. 8B.

After maintaining the remote shared window tree structures, the remote X server 600 determines, at step 616 of FIG. 8A, if there are any clients remaining. If it is determined, at step 616, that there are more clients remaining, the remote X server 600 returns to repeat steps 603 through 616. However, if it is determined at step 616 that there are no clients remaining, then the remote X server 600 exits at step 619.

Illustrated in FIG. 8B is the sharing events on remote X server process 620 referenced in FIG. 8A. The sharing events on remote X server process 620 receives and processes any received events or client(s) requests at step 621. At step 622, the sharing events on remote X server process 620 returns events and replies to the client(s).

At step 623, the sharing events on remote X server process 620 determines if a shared window was deleted. If a shared window was not deleted, the sharing events on remote X server process 620 proceeds to step 625. If, however, it is determined at step 623 that a shared window was deleted, the sharing events on remote X server process 620 deletes the window and sends a destroy window notification event to the remote sharedapp process 400 at step 624. The sharing events process on remote X server 620 then proceeds to step 625.

In step 625 the sharing events on remote X server process 620 determines if a new shared window was created. If a new shared window was not created, the sharing events on remote X server process 620 proceeds to step 631. If a new shared window was created, the sharing events on remote X server process 620 creates a window structure for the shared new window created and sends a create window notification event to the remote shared application process at step 626.

At step 631 the sharing event on remote X server process 620 determines if a button release event for an input-only window was received. If a button release event was not received, the sharing events on remote X server process 620 proceeds to step 633. If a button release event on an input-only window was received, the sharing events on the remote X server process 620 sends a button release event on the input-only window to the remote sharedapp process 400 in order to gain leadership at step 632. The sharing events process on remote X server 620 then proceeds to step 633.

At step 633, the sharing events on the remote X server process 620 determines if it is finished receiving events and client requests. If the sharing events on the remote X server process 620 determines that it is not finished receiving events and client requests, then the sharing events on remote X server process 620 returns to repeat steps 621 through 633. If, however, it is determined at step 633 that the sharing events on remote X server process 620 is finished, then the process exits at step 639.

The synchronization verification system and method of the present invention can be implemented in hardware, software, firmware, or a combination thereof. In the preferred embodiment(s), the window correlation system is implemented in software or firmware that is stored in a memory and that is executed by a suitable instruction execution system.

The synchronization verification system and method within the local sharedapp process 200 and remote sharedapp process 400, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the scope and principles of the invention. All such modifications and variations are intended to be included herein within the scope of the present invention and protected by the following claims.

What is claimed is:

1. A system for verifying the synchronization between a local application and a remote application, the system comprising:
   local application sharing logic configured to receive events to be shared from a local application, the local application comprising at least one local application window, each local application window comprising an index for identification, the local application sharing logic further configured to transmit the events;
   remote application sharing logic configured to receive the events from the local application sharing logic and transmit the events to a corresponding remote application, the corresponding remote application comprising at least one remote application window, each remote application window comprising an index corresponding to the index of a corresponding local application window; and
   window synchronization verification logic configured to verify that the local application and remote application are synchronized by monitoring the number of local application windows and the number of remote application windows and by correlating the indexes of the at least one local application window with the indexes of the at least one remote application window.

2. The system of claim 1, wherein the window synchronization verification logic further comprises:
   static synchronization verification logic configured to verify that the at least one local application window is synchronized with the at least one remote application window at system startup.

3. The system of claim 2, wherein the static synchronization verification logic further comprises:
   local static synchronization verification logic configured to select a first local application window and direct the corresponding remote application to locate a first remote application window corresponding to the first local application window; and
   remote static synchronization verification logic configured to process the indexes of the at least one remote application window in the corresponding remote application to identify the first remote application window corresponding to the first local application window.

4. The system of claim 3, wherein:
   the remote static synchronization verification logic further comprises remote static synchronization reply logic configured to notify the local static synchronization verification logic if the first remote application window corresponding to the first local application window is found in the corresponding remote application; and
   the local static synchronization verification logic further comprises local message generation logic configured to generate a message for display by the local application if the first remote application window corresponding to the first local application window is not found.

5. The system of claim 1, wherein the window synchronization verification logic further comprises:
   dynamic synchronization verification logic configured to verify, when the events are received by the remote application sharing logic, whether the at least one local application window is synchronized with the at least one remote application window.

6. The system of claim 5, wherein the dynamic synchronization verification logic further comprises:
   application input suppression logic configured to suppress input to the at least one local application window and the at least one remote application window if the at least one local application window and the at least one remote application window are not synchronized; and
   local message generation logic configured to generate a failed dynamic synchronization message for display to the local application if the at least one local application window and the at least one remote application window are not synchronized.

7. A method for verifying the synchronization between a local application and a remote application, the method comprising:
   receiving events to be shared from a local application, the local application including at least one local application window, each local application window comprising an index;
   transmitting the events from the local application to a corresponding remote application, the corresponding remote application including at least one remote application window, each remote application window comprising an index corresponding to the index of a corresponding local application window;
   comparing the number of local application windows with the number of remote application windows;
   correlating the indexes of the at least one local application window with the indexes of the at least one remote application window; and verifying that the local application and remote application are synchronized in response to the comparing and correlating.

8. The method of claim 7, further comprising:

providing static synchronization of the at least one local application window with the at least one remote application window prior to transmitting the events.

9. The method of claim 8, further comprising:

selecting a first local application window;

directing the corresponding remote application to locate a first remote application window having an index corresponding to the index of the first local application window; and finding the first remote application window corresponding to the first local application window in the corresponding remote application.

10. The method of claim 9, further comprising:

notifying the local application if the first remote application window corresponding to the first local application window is found in the corresponding remote application; and generating a message for display by the local application if the first remote application window corresponding to the first local application window is not found.

11. The method of claim 7, further comprising:

verifying synchronization of the at least one local application window with the at least one remote application window when the events are received by the remote application.

12. The method of claim 11, further comprising:

suppressing input to the at least one local application window and the at least one remote application window if the at least one local application window and the at least one remote application window are not in synchronization; and generating a failed dynamic synchronization message for display by the local application if the at least one local application window and the at least one remote application window are not in synchronization.

13. A system for verifying the synchronization between a local application and a remote application, the system comprising:

means for receiving events to be shared from a local application, the local application including a plurality of local application windows;

means for providing an index to each local application window;

means for transmitting the events from the local application to a corresponding remote application, the corresponding remote application including a plurality of remote application windows;

means for providing an index to each remote application window corresponding to the index of a corresponding local application window;

means for monitoring the number of local application windows;

means for monitoring the number of remote application windows;

means for matching the indexes of the local application windows with the indexes of the remote application windows to correlate the local application windows with corresponding remote application windows; and means for verifying synchronization between the local application and remote application.

14. The system of claim 13, further comprising:

means for providing static synchronization at system startup by synchronizing the local application windows with the remote application windows before events are shared.

15. The system of claim 14, further comprising:

means for selecting a first local application window;

means for directing the corresponding remote application to locate a first remote application window having an index corresponding to the index of the first local application window; and means for identifying the indexes of the remote application windows in the corresponding remote application to locate the first remote application window corresponding to the first local application window.

16. The system of claim 15, further comprising:

means for notifying the local application if the first remote application window corresponding to the first local application window is located in the corresponding remote application; and means for generating a message for display by the local application if the first remote application window corresponding to the first local application window is not located.

17. The system of claim 13, further comprising:

means for verifying synchronization of the local application windows with the remote application windows after the events are received by the remote application.

18. The system of claim 17, further comprising:

means for suppressing input to the local application windows and the remote application windows if the local application windows and the remote application windows are not synchronized; and means for generating a message in the local application to indicate that the local application windows and the remote application windows are not synchronized.

* * * * *